US006671619B2

(12) United States Patent
Kusano et al.

(10) Patent No.: US 6,671,619 B2
(45) Date of Patent: Dec. 30, 2003

(54) NAVIGATION DEVICE

(75) Inventors: Manabu Kusano, Iwaki (JP); Katsuya Saitoh, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/919,720

(22) Filed: Aug. 1, 2001

(65) Prior Publication Data

US 2002/0049533 A1 Apr. 25, 2002

(30) Foreign Application Priority Data

Aug. 16, 2000 (JP) .................................. 2000-246880

(51) Int. Cl.7 .............................................. G01C 21/30
(52) U.S. Cl. ........................ 701/209; 701/211; 701/212; 340/995.24
(58) Field of Search ................................. 701/211, 212, 701/209, 210, 213; 340/988, 990, 995.1, 995.24, 995.27

(56) References Cited

U.S. PATENT DOCUMENTS

| 5,434,591 | A |   | 7/1995  | Goto et al. ............... 345/123 |
|-----------|---|---|---------|------------------------------------|
| 5,442,557 | A |   | 8/1995  | Kaneko .................... 364/449 |
| 5,850,618 | A | * | 12/1998 | Suetsugu et al. ........... 701/200 |
| 5,877,704 | A | * | 3/1999  | Yoshida ................... 235/384  |
| 6,052,645 | A | * | 4/2000  | Harada .................... 340/990  |
| 6,088,652 | A | * | 7/2000  | Abe ........................ 340/995 |
| 6,144,920 | A | * | 11/2000 | Mikame .................... 340/988  |
| 6,199,014 | B1| * | 3/2001  | Walker et al. ............. 340/995  |
| 6,202,026 | B1| * | 3/2001  | Nimura et al. ............. 340/995  |
| 6,282,493 | B1| * | 8/2001  | Kitagawa et al. ........... 340/995  |

* cited by examiner

Primary Examiner—Tan Q. Nguyen
(74) Attorney, Agent, or Firm—Brinks Hofer Gilson & Lione

(57) ABSTRACT

A navigation device is provided with detailed map information of service areas and parking areas on freeways, and in the event that the vehicle to which the navigation device is mounted enters a service area for example while driving along the freeway which is a guided route, the navigation device reads out detailed map information of the service area which the vehicle has entered and displays a detailed map of this area such that the driver can readily understand the location of parking space, restaurants, stores, etc., and also displays the current position of the vehicle. Thus, in the event that the vehicle enters a service area or parking area while on a guided route, where what is within the area and where the vehicle is can be displayed in a readily understood manner, by the vehicle entering the area.

23 Claims, 30 Drawing Sheets

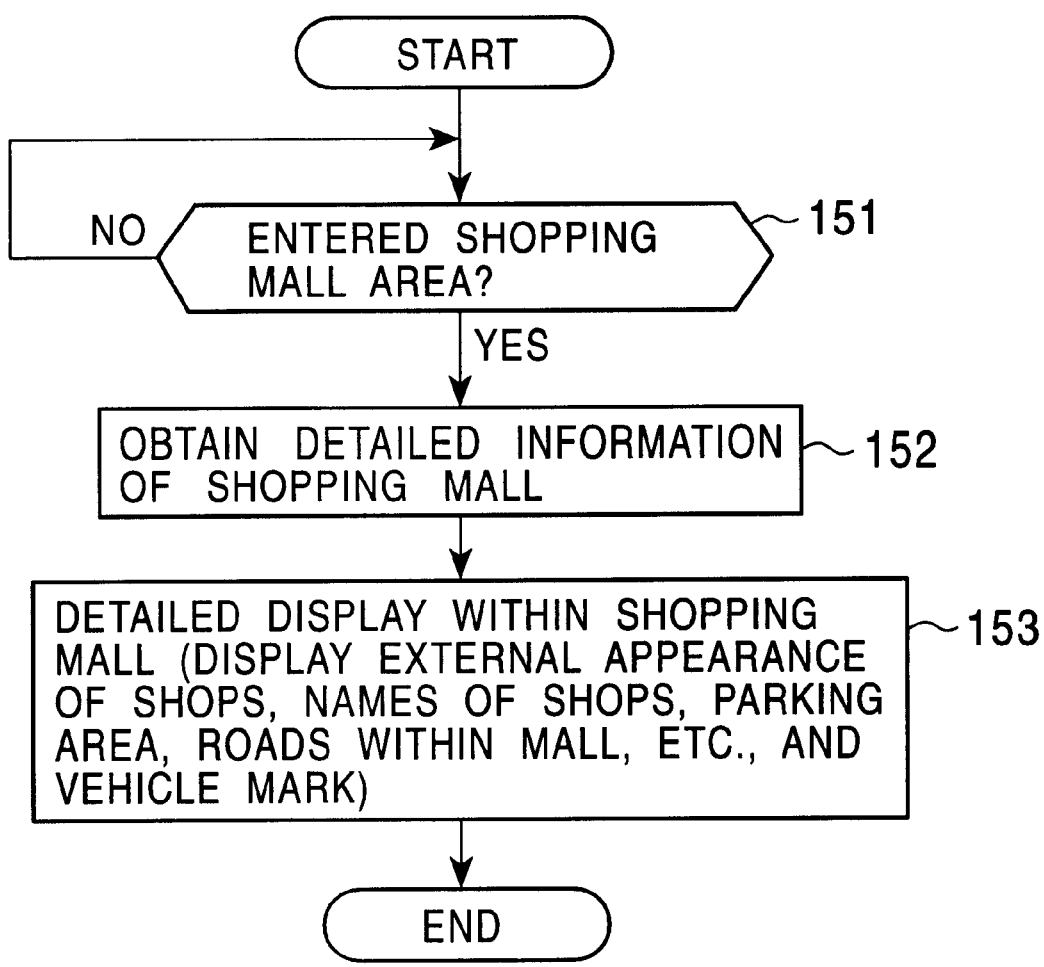

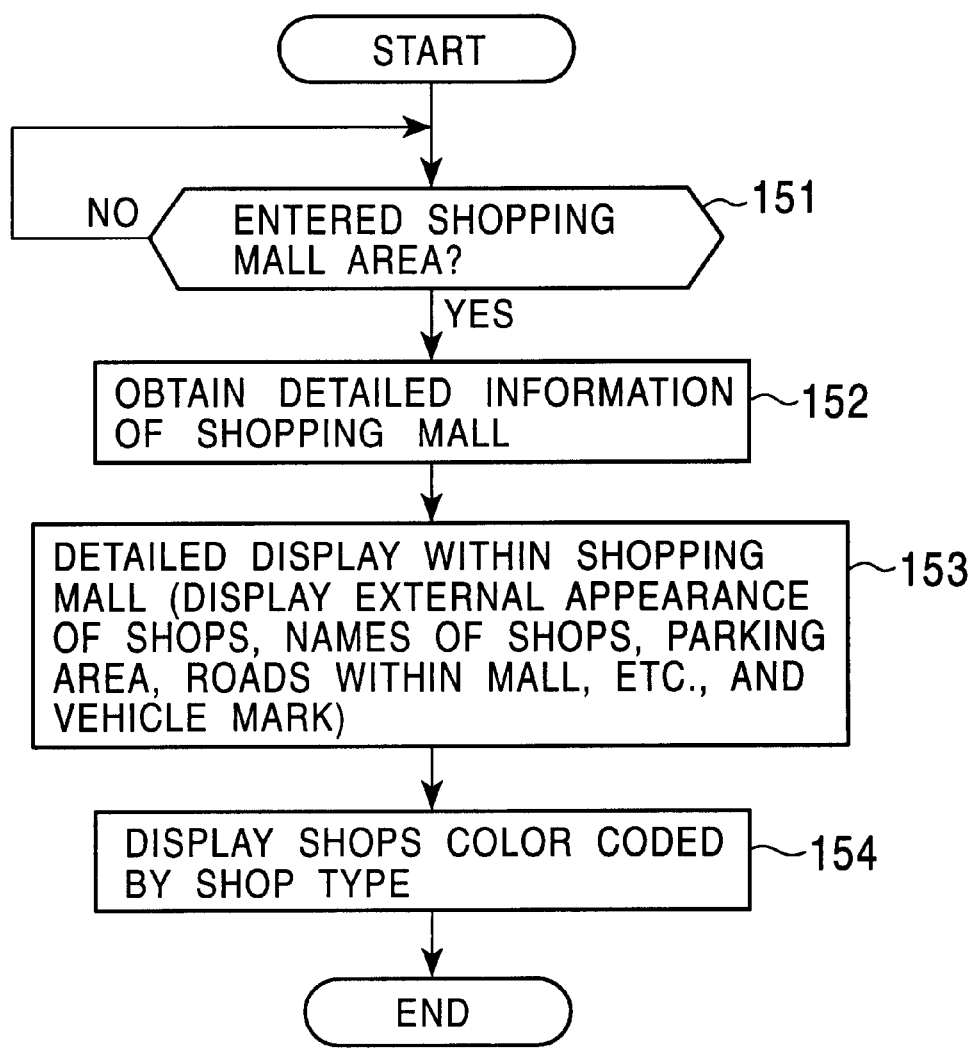

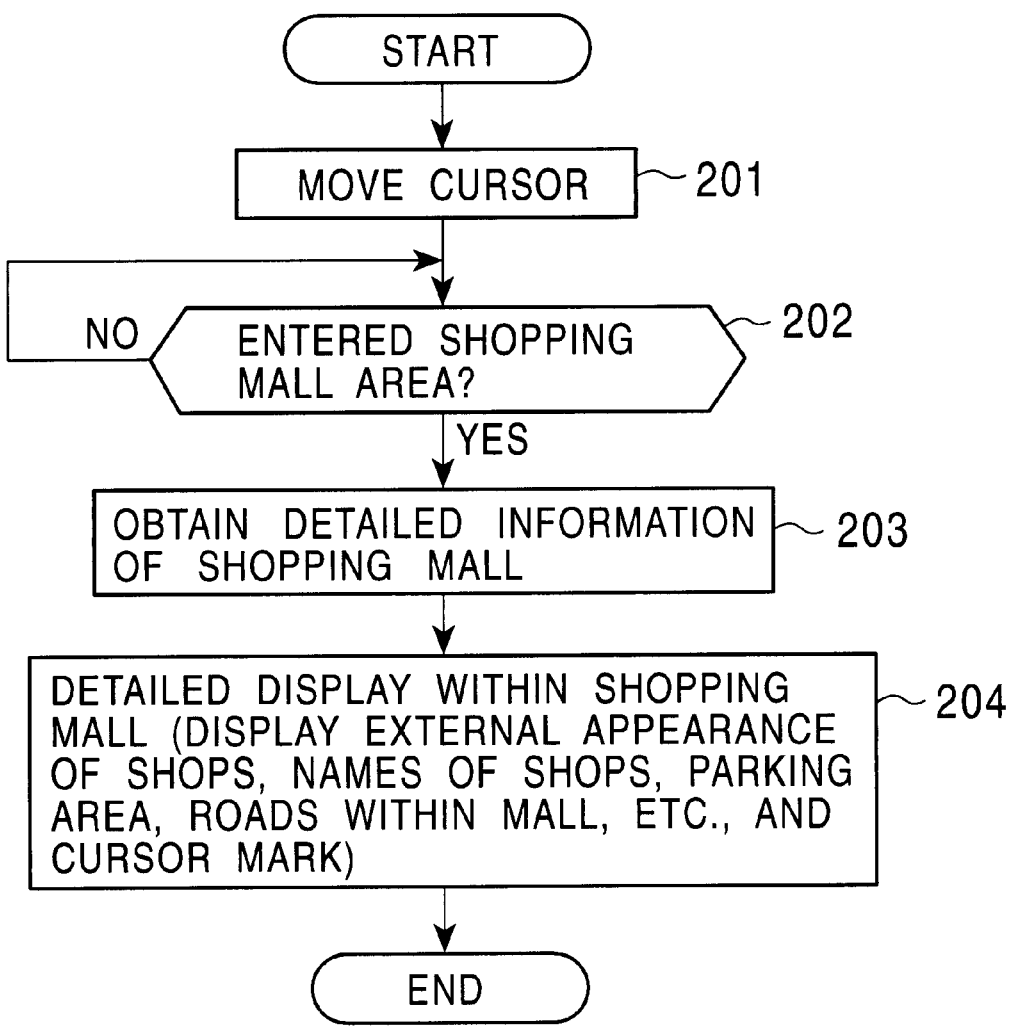

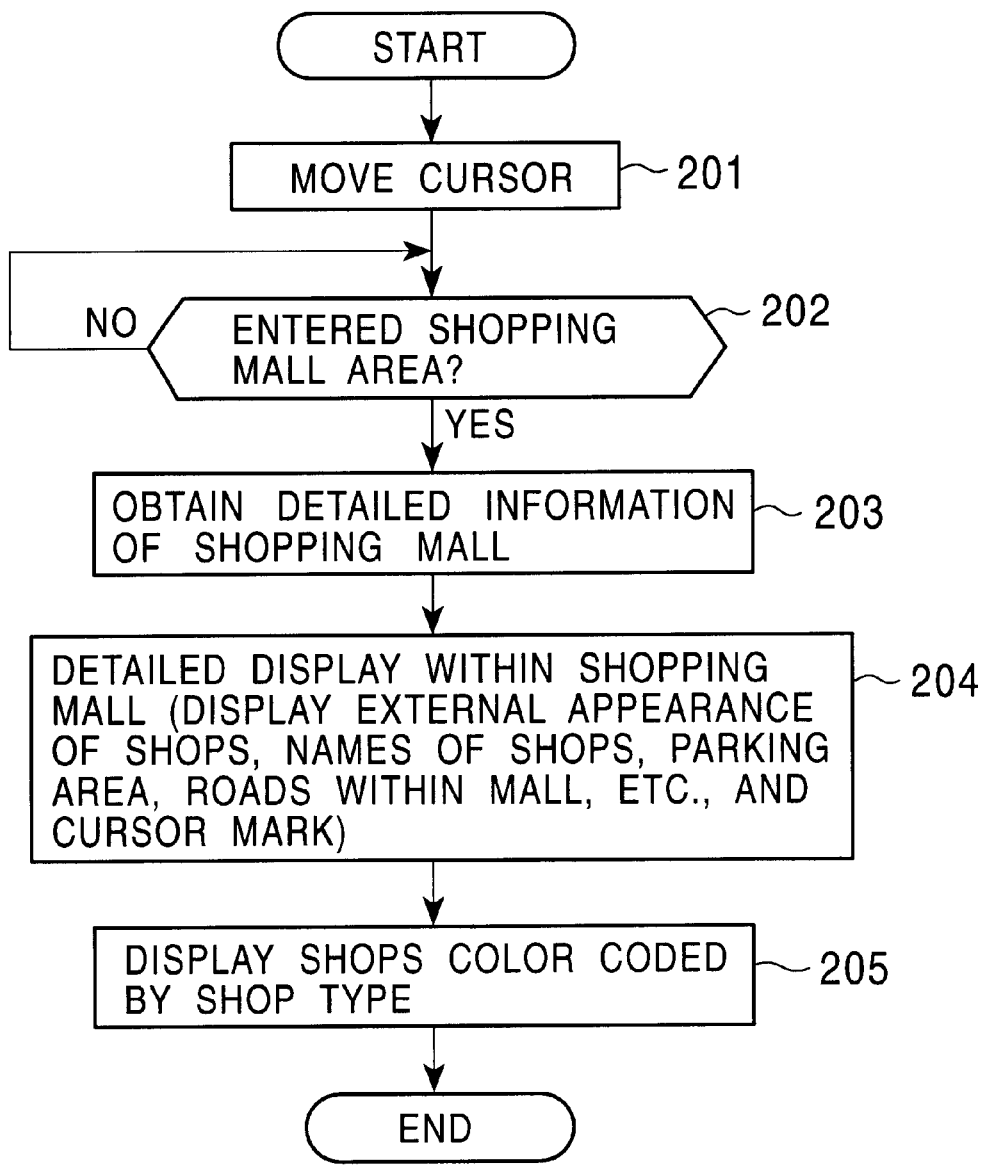

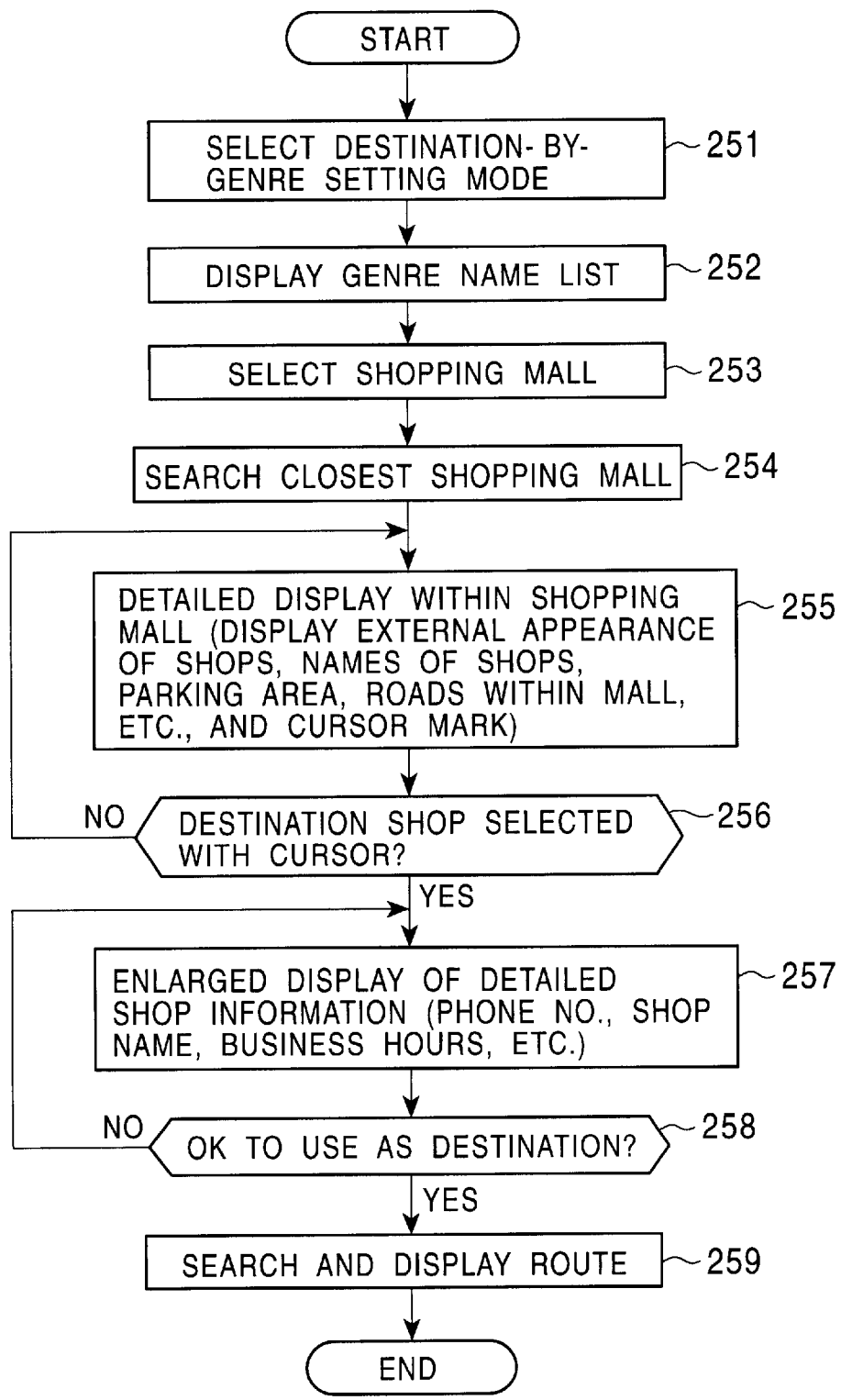

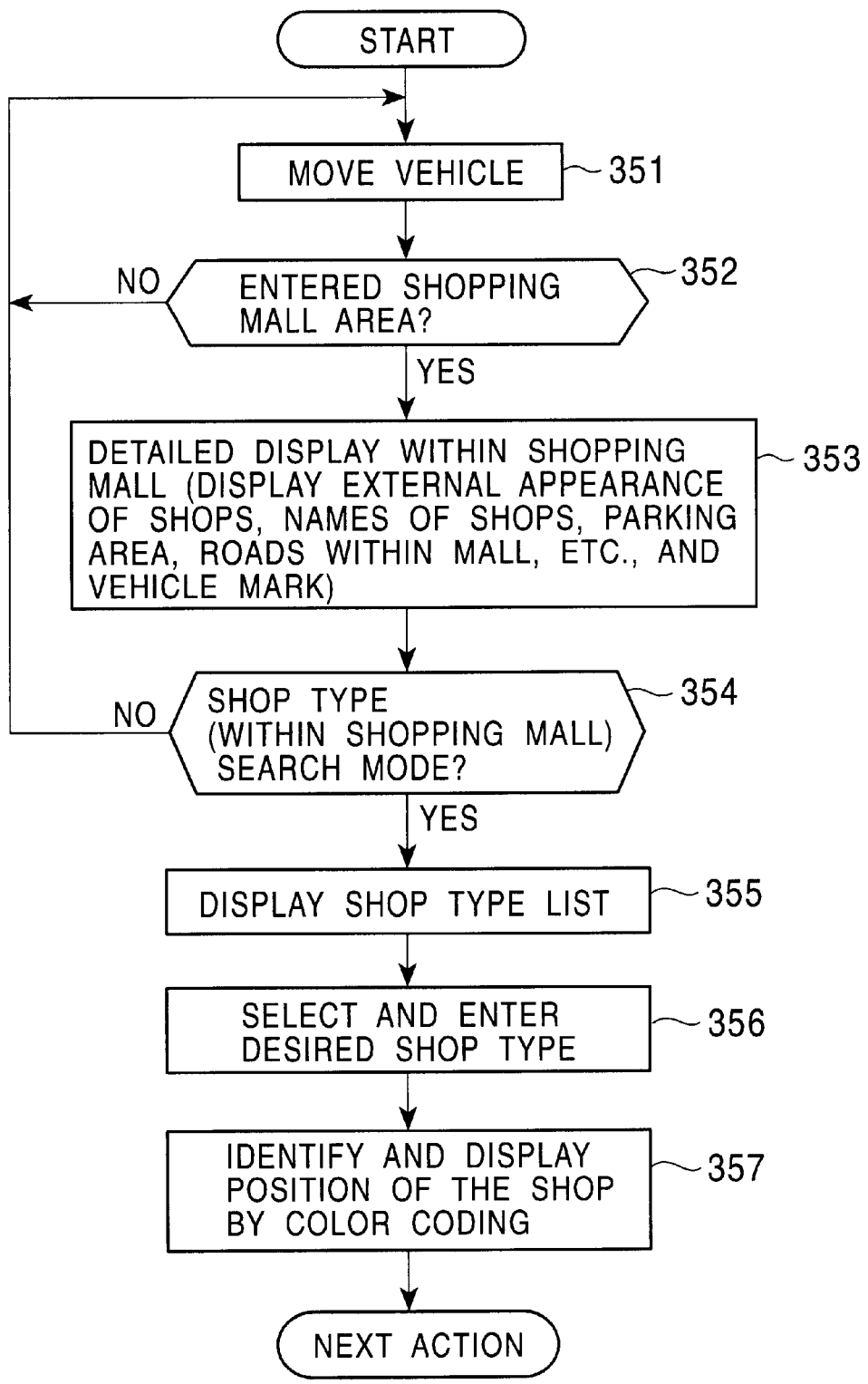

CM

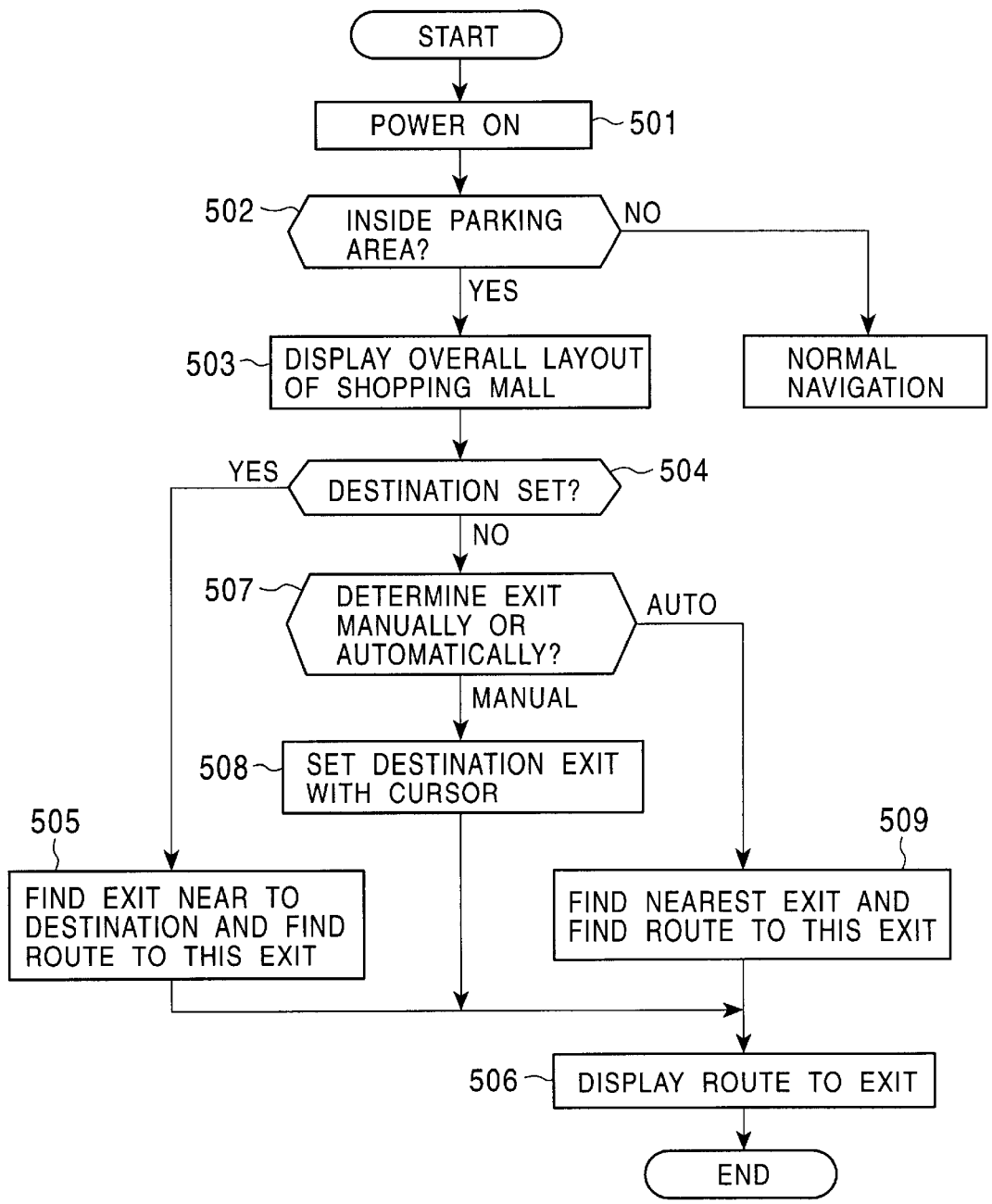

NAVIGATION DEVICE

BACKGROUND OF THE INVENTION

1. Field of the Invention

The present invention relates to a navigation device, and particularly relates to a navigation device which, in the event that a vehicle enters a service area or parking area while driving a guided route on a freeway, or enters a shopping mall, displays detailed maps of within the area or within the mall, and also displays a guiding route by route calculations.

2. Description of the Related Art

Navigation devices which guide vehicles such that the driver can reach a desired destination operate by detecting the position of the vehicle, reading out map data of the area where the vehicle is from a storing media such as a CD-ROM, DVD-ROM, etc., displaying a map image on a display screen, and drawing a vehicle mark (the term "vehicle" here indicates the vehicle to which the navigation device is mounted, unless specifically stated otherwise) overlapped at a particular position on the map image. The vehicle mark on the screen is moved on the screen, or the vehicle mark on the screen is fixed at a certain position on the screen (e.g., the center) and the map is scrolled, in accordance with the change in the current vehicle position due to motion of the vehicle. This allows the driver to be able to view map information in the area where the vehicle is located at a glance. This navigation device has route guiding functions for finding a guiding route from the point of origin to the destination, displaying the guide route on the map, and providing intersection guidance (displaying enlarged images of the intersection, and displaying the direction of progression).

If a vehicle CM (shown in FIG. 30A) mounted with a conventional navigation device enters a service area or parking area while driving along a freeway FHW which is the guided route, the conventional navigation device merely displays a landmark LM. The conventional navigation device only indicates that the vehicle has entered a service area or parking area. Thus, the conventional navigation device displays no guidance in returning to a portion of a guided route, such as freeway FHW (FIG. 30B). Accordingly, in such an area a driver may not know the location of points of interest in the area, where the vehicle is located within the area, how to find an exit from the area, or how to return to a portion of a guided route, such as freeway FHW.

Also, in the United States, stores, movie theaters and other facilities, and parking lots often form complexes called shopping malls. Conventionally, even in the event that the vehicle enters the shopping mall, there is no navigation control therein, with only the vehicle mark moving through the shopping mall. Accordingly, the driver may be inconvenienced because the driver may not know where the stores and facilities, parking, and exits are located in the shopping mall. Also, even if the driver knows where the destination is, shopping malls often have one-way lanes, and so the destination cannot be reached speedily.

SUMMARY OF THE INVENTION

In light of the above problems, it is a first object of the present invention to display points of interest and the location of a vehicle within a service area or parking area which the vehicle has entered, in a manner that is readily understood.

It is a second object of the present invention to allow the vehicle to smoothly return to a portion of a guided route, such as a freeway, from the service area or parking area which the vehicle has entered.

It is a third object of the present invention to display, in a manner that is readily understood, the formation of the exit when the vehicle approaches the exit of the service area or parking area.

It is a fourth object of the present invention to display the location of desired stores and facilities, parking areas, and exits within a shopping mall which the vehicle or cursor has entered, in a manner that is readily recognized.

It is a fifth object of the present invention to allow the position of desired stores and facilities within the shopping mall to be readily recognized, and to allow these to be readily set as destinations.

It is a sixth object of the present invention to search routes to desired stores, facilities, and exits, so as to realize route guiding within the shopping mall.

It is a seventh object of the present invention to allow stores and facilities within a shopping mall to be set as destinations outside of the shopping mall, and performing route guiding toward the destination stores and facilities.

According to the present invention, the above first object is achieved by having detailed map information of inside freeway service areas and parking areas, and displaying detailed maps of within such an area in the event that the vehicle enters an arbitrary area while driving on a freeway which is a guiding route.

According to the present invention, the above second object is achieved by performing rerouting calculations in the event that the vehicle enters an area, and displaying a guiding route.

According to the present invention, the above third object is achieved by displaying the exit area in an enlarged manner in the event that the distance from the vehicle to the area exit is equal to or less than a certain distance while driving along the guiding route within the area, and also displaying the direction of progression.

According to the present invention, the above fourth object is achieved by displaying a detailed map of inside the shopping mall using database information, in the event that the vehicle enters a shopping mall.

According to the present invention, the above fifth object is achieved by:

(1) including building layouts, store layouts, store names, parking areas, and traffic lanes within the mall, in the detailed maps; or (2) identifying and displaying the store layouts (store polygons) with the stores color coded according to type of store; or (3) displaying detailed maps of specified floors by floor; or (4) in the event that at least the first letter in a store name is input in an alphabetical store name search, making reference to a store list and searching for a store having the same letter as that input, and displaying the position of the store with the cursor; or (5) in the event that a store type (category) is input in a store type search, making reference to the store list and displaying stores of the input store type in an identifiable manner.

According to the present invention, the above sixth object is achieved by:

(1) in the event that a particular store is set as a destination store, searching the route to the parking area nearest to the destination store and displaying this on the display unit; or (2) in the event of entering a shopping mall, automatically searching the route to the nearest parking area and displaying this on the display unit; or (3) at the time of turning on power to the navigation device within a parking area, searching and displaying the route to the nearest exit from the parking area.

According to the present invention, the above seventh object is achieved by:

(1) in the event that the cursor enters the shopping mall, displaying a detailed map of inside the shopping mall using the database information, and specifying the destination store with the cursor; or (2) in the event that a shopping mall is set as the genre of destination and also a particular shopping mall is specified in a search by genre, displaying a detailed map of inside the shopping mall, and specifying the destination store with the cursor.

BRIEF DESCRIPTION OF THE DRAWINGS

FIG. 12 is a detailed display flow of within the shopping mall from entrance of vehicle for use in an embodiment of the present invention;

FIG. 13 is the flow of color-coded display according to store type for use in an embodiment of the present invention;

FIG. 16 is the flow of detailed display within the shopping mall from entrance of cursor for use in an embodiment of the present invention;

FIG. 17 is the flow of color-coded display according to store type for use in an embodiment of the present invention;

FIG. 19 shows detailed display control of within the shopping mall by destination setting by genre for use in an embodiment of the present invention;

FIG. 23 is a display of a destination store position by store type for use in an embodiment of the present invention;

FIG. 29 shows route search display control to an exit for use in an embodiment of the present invention.

Figure 1A:
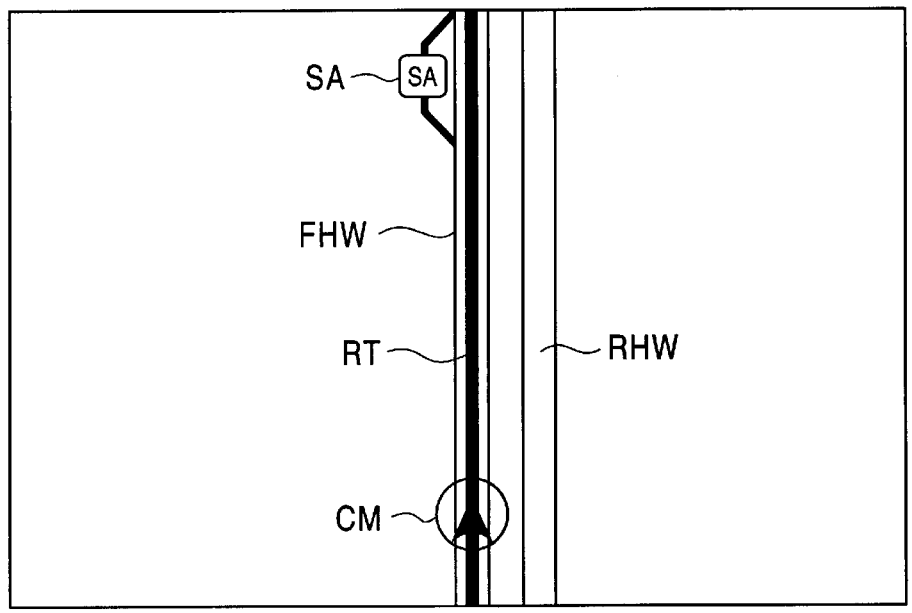
FIGS. 1A and 1B are schematic explanatory diagrams of an embodiment of the present invention.
Figure 1B:
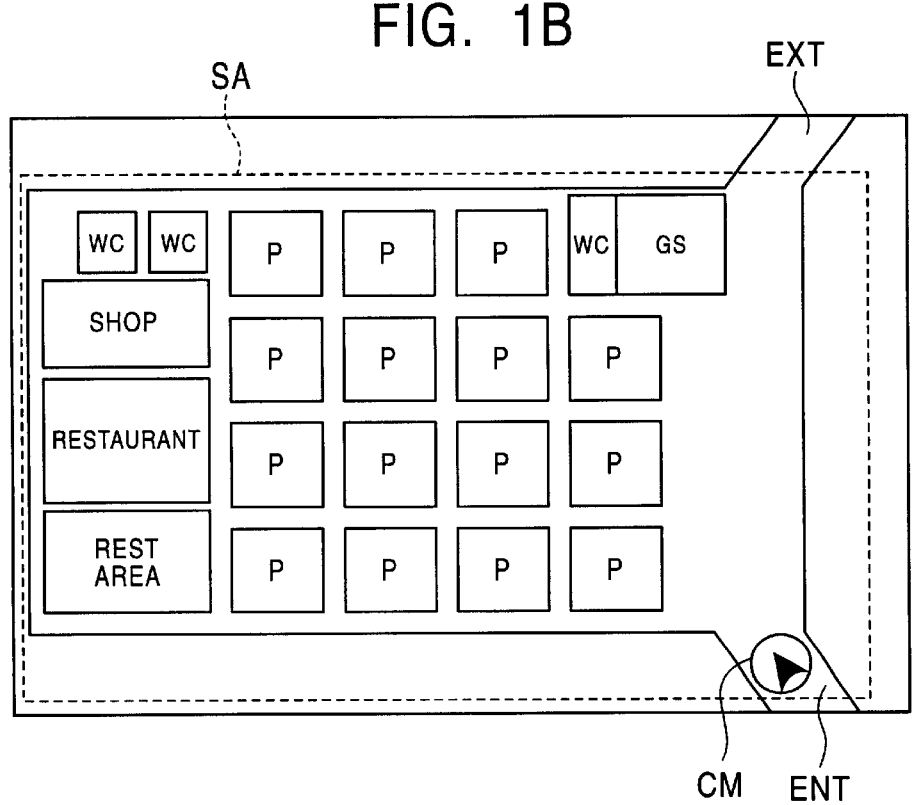

DESCRIPTION OF THE PREFERRED EMBODIMENTS (A) Schematic description of the present invention FIGS. 1A and 1B comprise schematic explanatory diagrams of an embodiment of the present invention, showing an example of a display where a vehicle driving on a freeway, which is a guided route, enters into a service area. In the figures, the symbol CM denotes the vehicle position mark, RT denotes the guided route, FHW denotes the freeway on which the vehicle CM is traveling, RHW denotes the freeway lanes for traffic in the other direction, SA denotes a service area, ENT denotes the entrance to the service area, and EXT denotes the exit from the service area.

With the navigation device according to the present invention, detailed maps of freeway service areas and parking areas are included in the CD-ROM storing map information, and in the event that the vehicle CM (FIG. 1A) enters into a service area SA while driving on the freeway FHW which is the guided route, the device displays a detailed map of the service area SA and the position of the vehicle CM, as shown in FIG. 2B.

Thus, in the event of entering into the area, the driver can readily understand the display of where what is within the area, and where the vehicle is as well.

Figure 2:
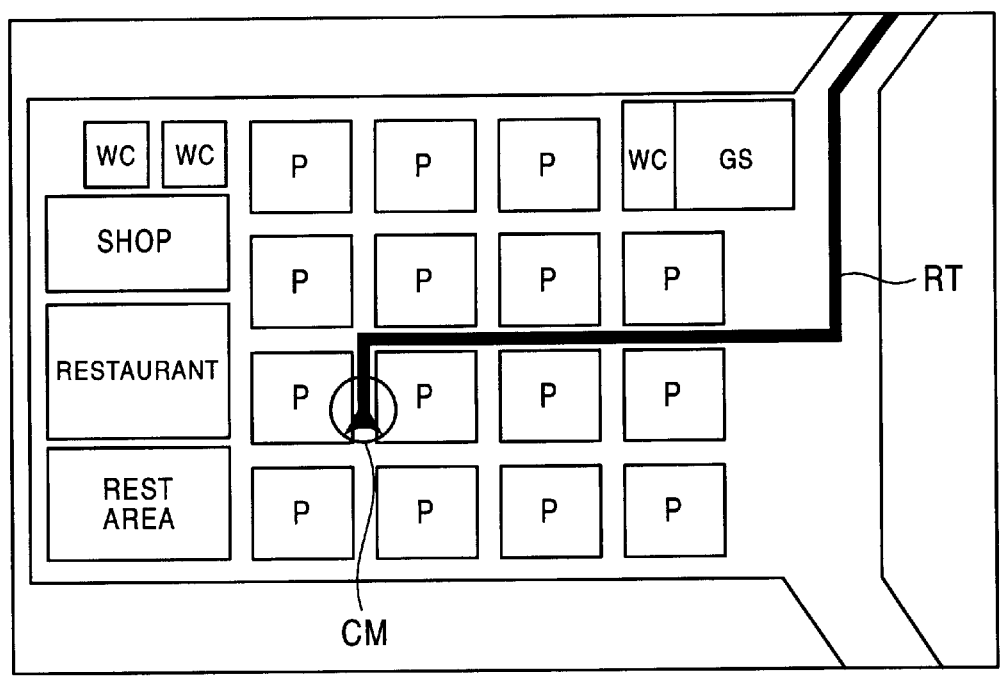
FIG. 2 is a schematic explanatory diagram of an embodiment of the present invention.

FIG. 2 is a schematic explanatory diagram of an embodiment of the present invention, showing an example of display in the event of performing rerouting calculations within a service area. In the figure, the symbol CM denotes the vehicle position mark, and RT denotes the rerouted route.

When the vehicle CM enters the service area, the reroute calculating program of the navigation device searches a route from the current position of the vehicle CM back to the freeway which is the guiding route, and displays the calculated route RT.

Thus, even in the event that the area is vast, the vehicle which has entered the area can smoothly return to the freeway which is the guiding route without loosing its way.

Figure 3A:
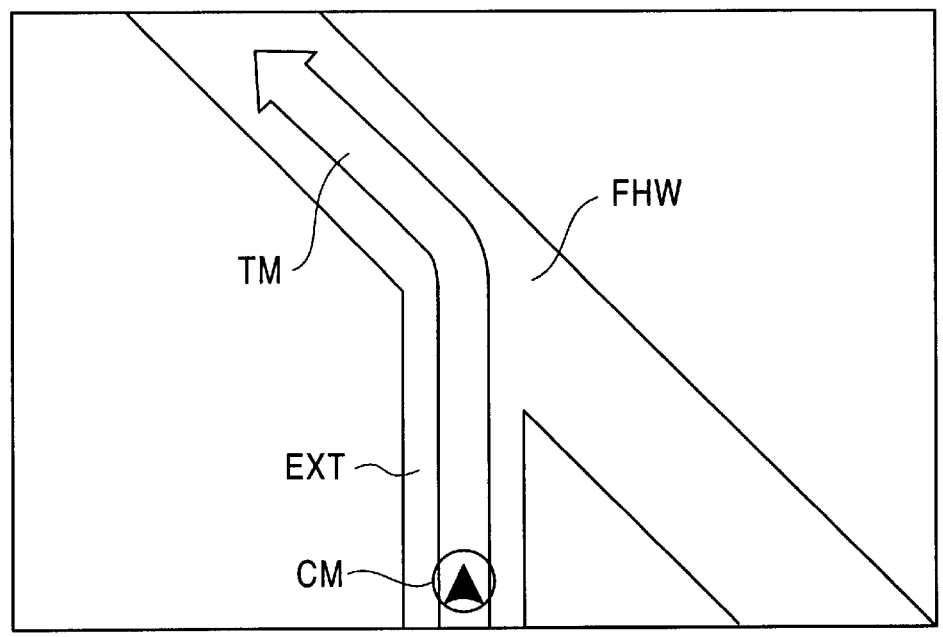
FIGS. 3A and 3B are schematic explanatory diagrams of an embodiment of the present invention.
Figure 3B:
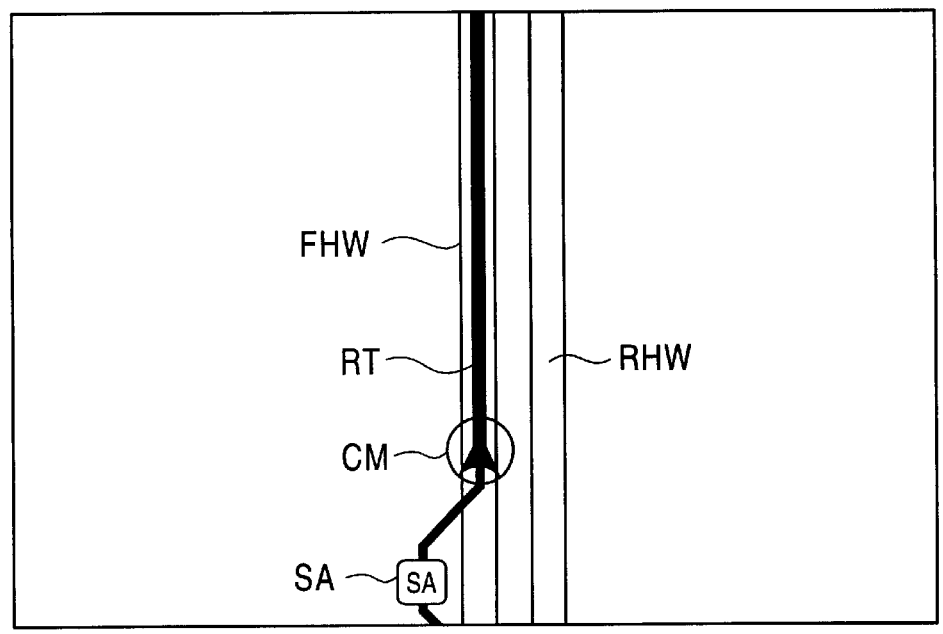

FIGS. 3A and 3B comprise schematic explanatory diagrams of an embodiment of the present invention, showing an example of display in the event that the distance from the vehicle position to the service area exit is equal to or less than a predetermined distance. In the Figures, the symbol CM denotes the vehicle position mark, EXT denotes the exit from the service area, TM denotes the direction of progression mark, FHW denotes the freeway on which the vehicle CM is traveling, RHW denotes the freeway lanes for traffic in the other direction, SA denotes a service area, and RT denotes the rerouted route.

With the navigation device according to the present invention, in the event that the vehicle CM approaches the service area exit EXT (FIG. 3A), the device displays an enlarged image of the exit area, and also displays the direction of progression TM. Then, once the vehicle has returned from the service area exit to the freeway, the device displays the rerouted route and the normal map screen, as shown in FIG. 3B.

Thus, the device can display the formation of the exit at the time of heading toward the exit from the area, in a readily-understood manner.

Also, with the navigation device according to an embodiment of the present invention, detailed maps of shopping malls are included in the CD-ROM which stores map information, and a detailed map of the shopping mall and the vehicle mark are displayed in the event that the vehicle enters a shopping mall. Thus, at the time of entering a shopping mall, the device can display what sort of stores, facilities, and parking areas there are at what parts of the shopping mall, and also display where in the shopping mall the vehicle currently is, in a readily-understood manner.

(B) First Embodiment of the Present Invention (a) Navigation Device

Figure 4:
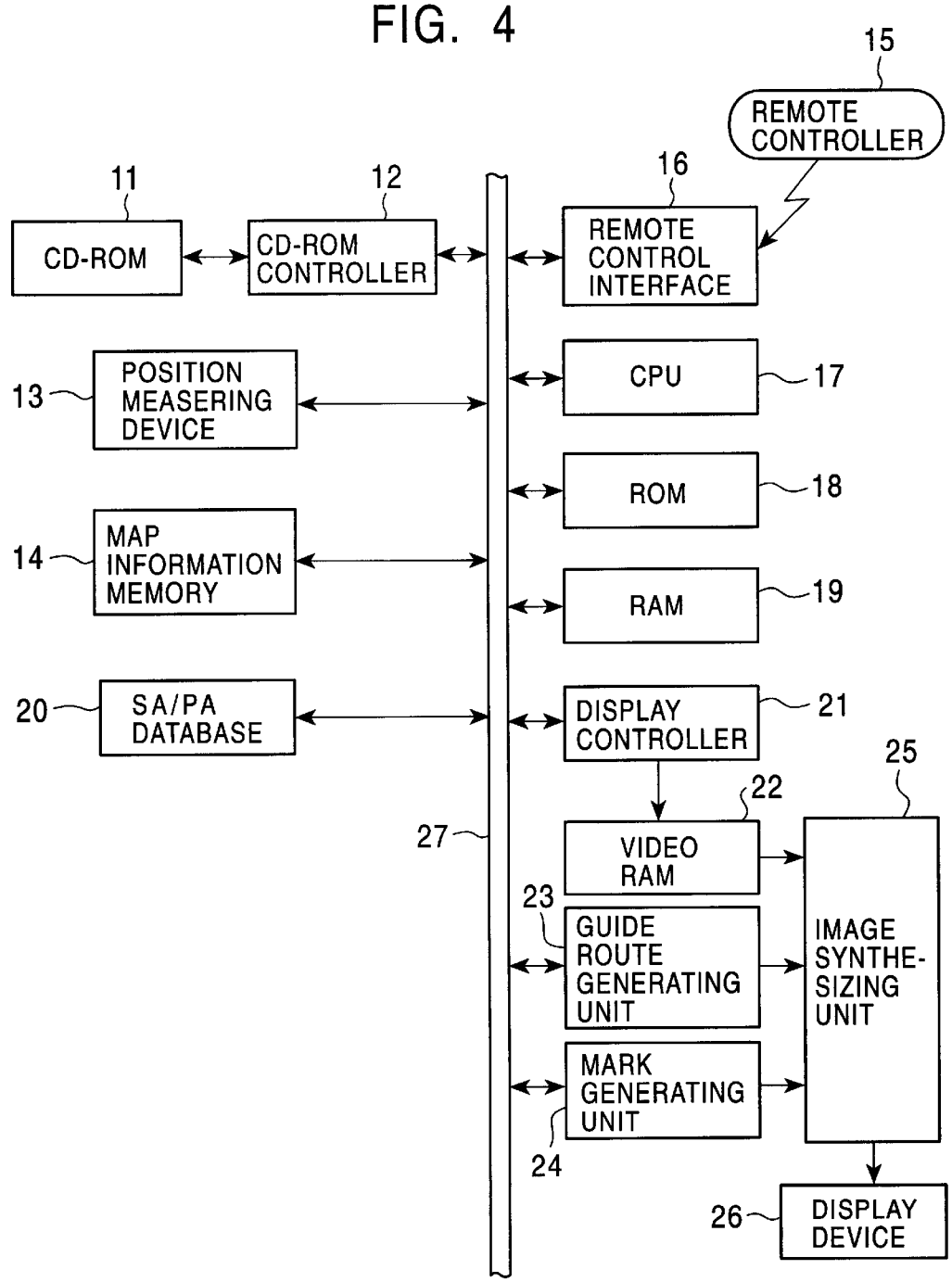
FIG. 4 is a configuration diagram of an embodiment of the present invention.

FIG. 4 is a configuration diagram of the navigation device according to an embodiment of the present invention. In the figure, a map storing medium 11, such as a CD-ROM, stores map information. When a CD-ROM is used, a CD-ROM control unit 12 controls the reading of map information from the CD-ROM. A position measuring device 13 measures the current position of the vehicle. The position measuring device comprises a vehicle speed sensor for detecting the distance of motion, an angular speed sensor for detecting the bearing of motion, a GPS receiver, and a position measuring CPU. A map information memory 14 stores the map information read out from the CD-ROM 11.

A remote control 15 is also included for performing menu selecting operations, enlarged/reduced display operations, manual map scrolling, etc. The remote control 15 is connected with a remote control interface 16.

A processor (CPU) 17 controls the entire navigation device. A ROM 18 stores various programs such as the in-area reroute processing programs for performing reroute calculations within service areas or parking areas, guided route searching processing programs, etc. A RAM 19 for stores the processing results.

Also incorporated into this embodiment is a SA/PA database 20. The SA/PA database stores detailed map information of service areas SA and parking areas PA on the freeway.

In order to display route instruments to a user, this embodiment includes a display controller 21 for generating map images, video RAM 22 for storing the map images generated by the display controller, and a guide route generating unit 23 which uses the processing results of the guide route search processing program and rerouting program stored in the RAM 19. Also included is a mark generating unit 24 for generating the vehicle position mark, cursor, etc., an image synthesizing unit 25 for synthesizing and outputting the images, a display device 26 for displaying images output from the image synthesizing unit, and a bus 27.

(b) SA/PA Database

Figure 5:
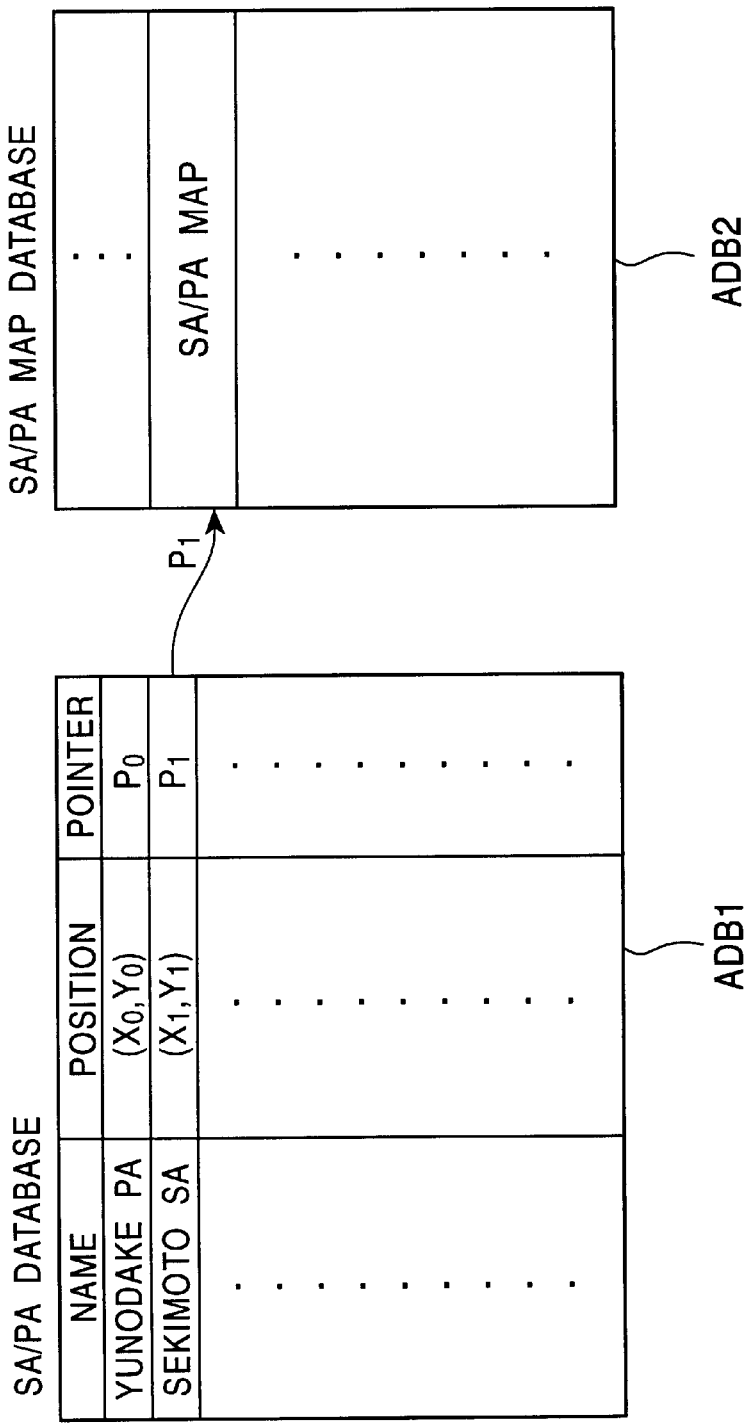
FIG. 5 is an explanatory diagram of an SA/PA database for use in an embodiment of the present invention.

The SA/PA database 20 is for storing detailed area information, such as area position data and pointers indicating the stored location of detailed area maps, in accordance with the names of service areas and parking areas, such information being read out from the CD-ROM 11 and stored (FIG. 4). That is, as shown in FIG. 5, the SA/PA database 20 has a hierarchical configuration, wherein the SA/PA database ADB1 stores names positions and pointers for each area, and the SA/PA map database ADB2 stores SA/PA maps, i.e., detailed map data for displaying within the areas in detail. An example of a display using the detailed map data is shown in FIG. 1B, wherein the positions and shapes of the parking space P, gasoline station GS, stores, etc., within the area, are displayed in detail.

(c) Flowchart

Figure 6:
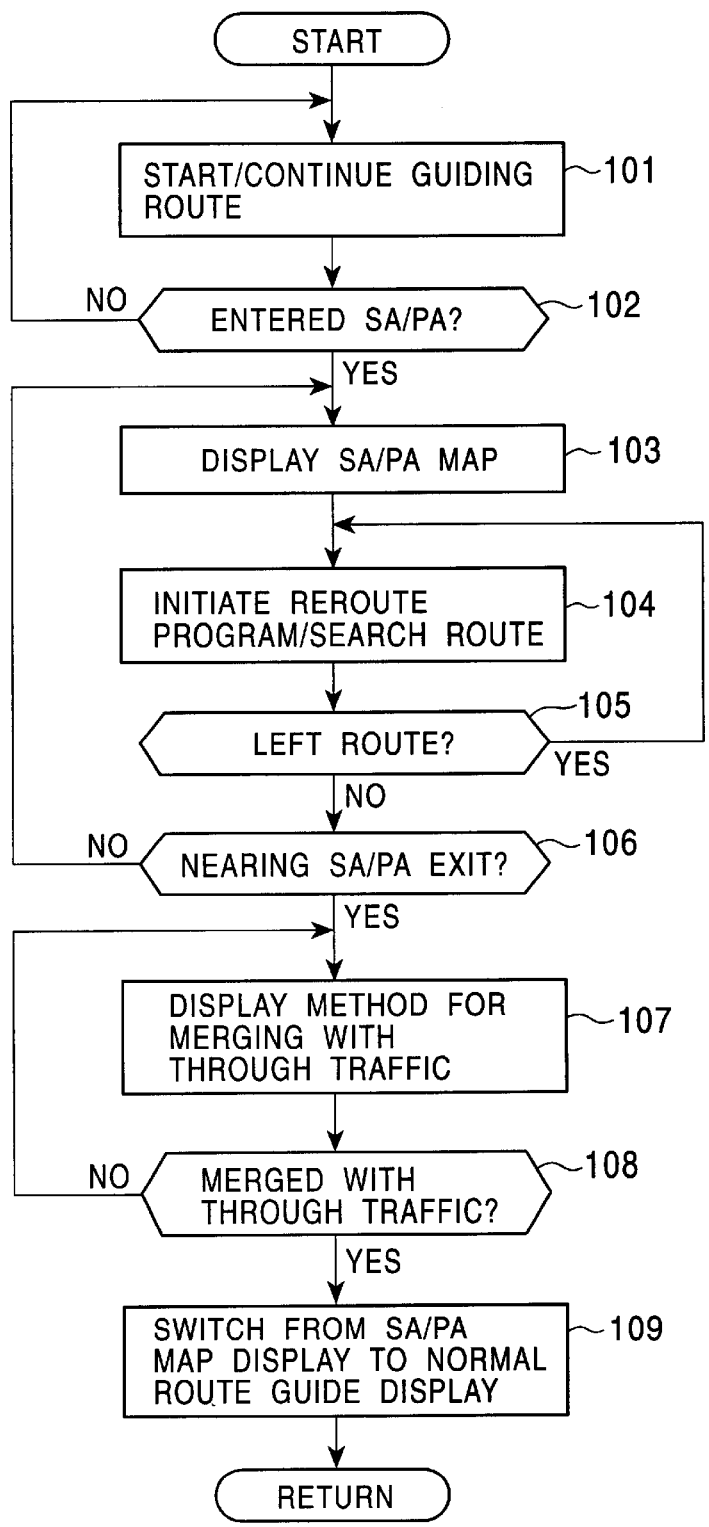
FIG. 6 is a flowchart of an embodiment of the present invention.

FIG. 6 is a flowchart of an embodiment of the present invention.

First, the driver sets the destination, following which the navigation device searches the guide route to the destination and starts route guiding (act 101). Next, whether or not the vehicle CM (FIG. 1A) has left the freeway and entered a service area SA or parking area PA is judged (act 102), and in the event that the vehicle has not left the freeway, the processing from act 101 on is repeated. On the other hand, in the event that the vehicle has left the freeway and entered a service area SA or parking area PA, the detailed map information of the entered service area SA or parking area PA stored in the SA/PA database 20 (FIG. 4) is read out, and a detailed map of the entrance area is displayed on the display device 26 using the detailed map information as shown in FIG. 1B, with the vehicle position as the key (act 103).

Subsequently, the in-area rerouting program stored in the ROM 18 (FIG. 4) is started, which searches a guide route from the current position of the vehicle CM (FIG. 2), and displays the route RT as shown in FIG. 2 (act 104). Next, judgement is made whether or not the vehicle CM has left the guided route RT searched in act 104 (act 105), and in the event that the vehicle has left the guided route RT, the processing of act 104 on is repeated. On the other hand, in the event that the vehicle has not left the route, judgement is made whether or not the vehicle CM has approached a predetermined distance to the area exit EXT, within 100 meters for example (act 106).

In the event that the distance from the vehicle CM to the area exit EXT is 100 meters or more, the processing from act 103 on is repeated, and on the other hand in the event that the vehicle approaches within 100 meters the an enlarged image of the exit area is displayed, and the direction of progression TM is displayed, as shown in FIG. 3A (act 107). Next, judgement is made whether or not the vehicle CM has merged with the through traffic of the freeway which is the guided route (act 108), and in the event that the vehicle has not merged, the processing of act 107 on is repeated, and in the event that the vehicle has merged, the detailed map display of the area is switched to the normal map screen (FIG. 3B) with the guided route (act 109).

(C) Example of Application

The above description has been made regarding a service area or parking area from which the driver can return to the freeway which is the guided route relatively easily, but the present invention is more effective when applied to an area with complicated merging.

Figure 7A:
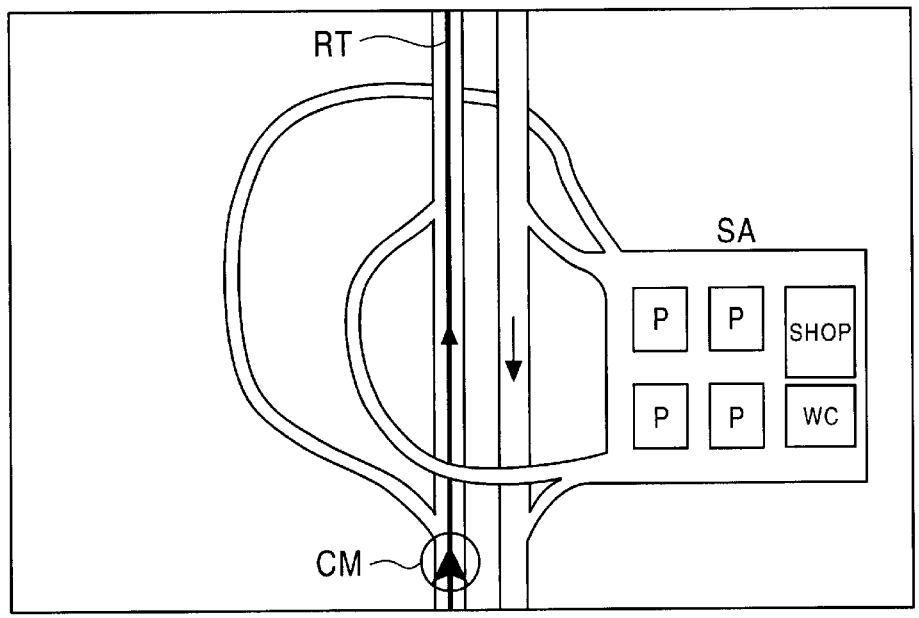
FIGS. 7A and 7B are explanatory diagrams of an embodiment of the present invention.
Figure 7B:
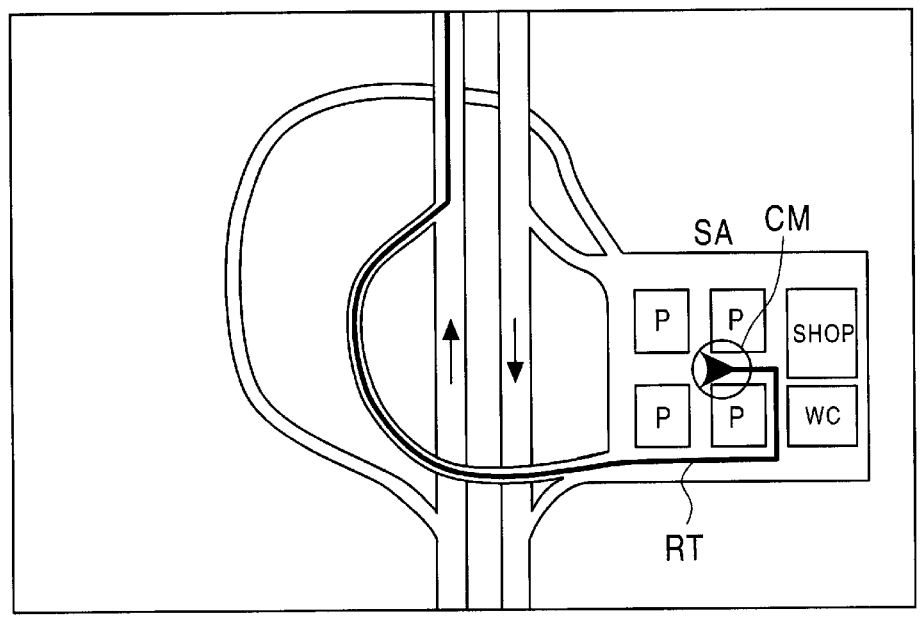

For example, let us say that there is a service area SA which is shared by traffic in both directions on the freeway, which creates a complicated merging situation. Even in the case of such, the vehicle CM (FIG. 7A) driving on the guided route RT on the freeway can enter this service area SA and return to the freeway which is the guided route without mistaking the exit, due to the navigation device performing rerouting calculations and displaying a new guided route RT as shown in FIG. 7B.

(D) Second Embodiment (a) Navigation Device

The first embodiment deals with a case wherein the vehicle enters a service area or parking area while driving on a freeway, but similar display control of detailed maps and route guiding control can be made in the event that the vehicle enters a shopping mall, as well.

Figure 8:
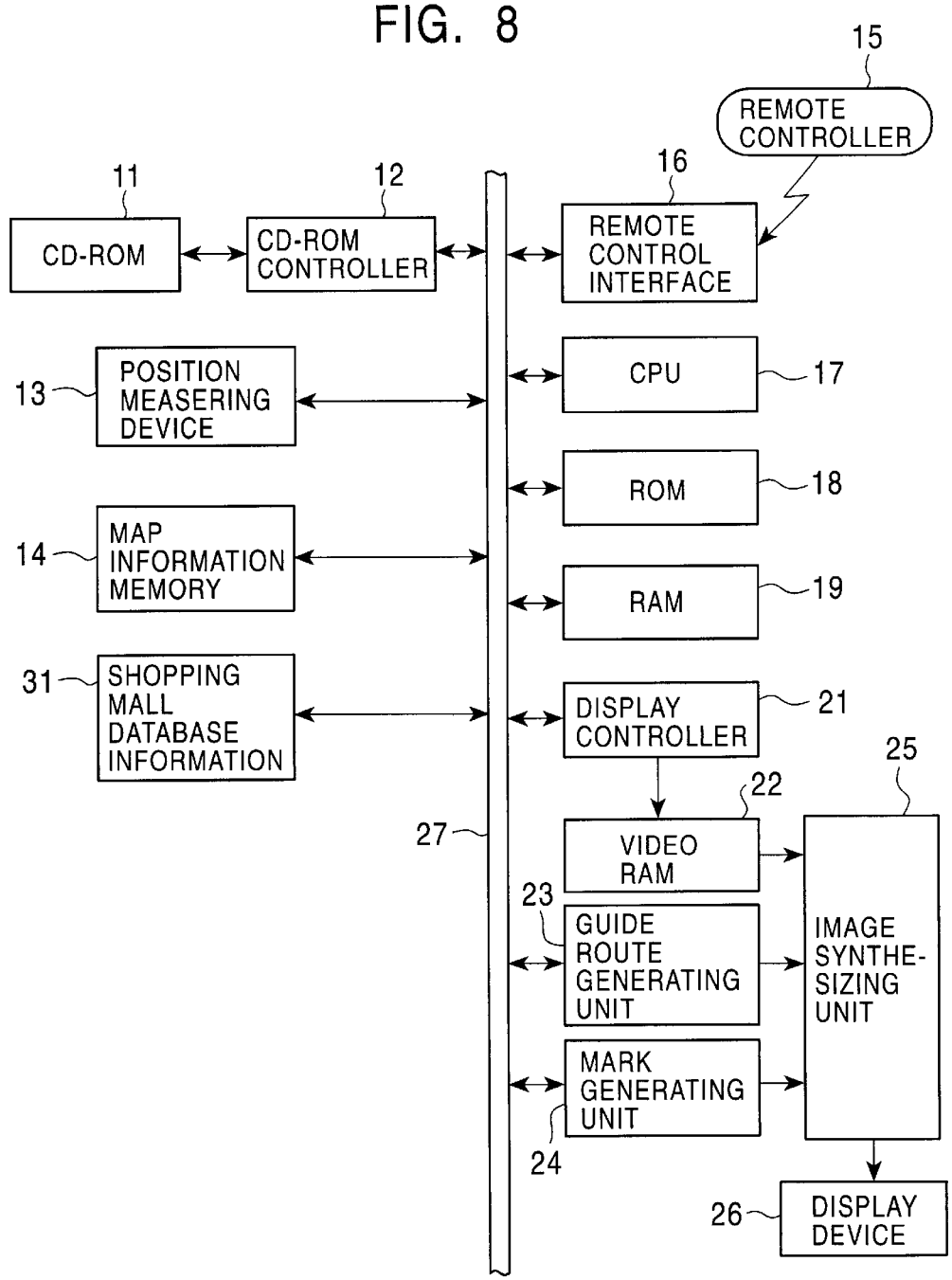
FIG. 8 is another configuration diagram of an embodiment of the present invention.

FIG. 8 is a configuration diagram of the navigation device according to the second embodiment, and the parts thereof which are the same as those of the navigation device according to the first embodiment shown in FIG. 4 are denoted with the same reference numerals. The second embodiment differs from the first embodiment in that:

(1) A shopping mall database 31 has been provided instead of the SA/PA database 20;
(2) Detailed information of the shopping mall is recorded on the CD-ROM 11, and the detailed shopping mall information is read out and saved in the database 31.
(3) Various programs, such as a display control program for the detailed map of the shopping mall and an in-mall route searching program, are stored in the ROM 18.

Figure 9:
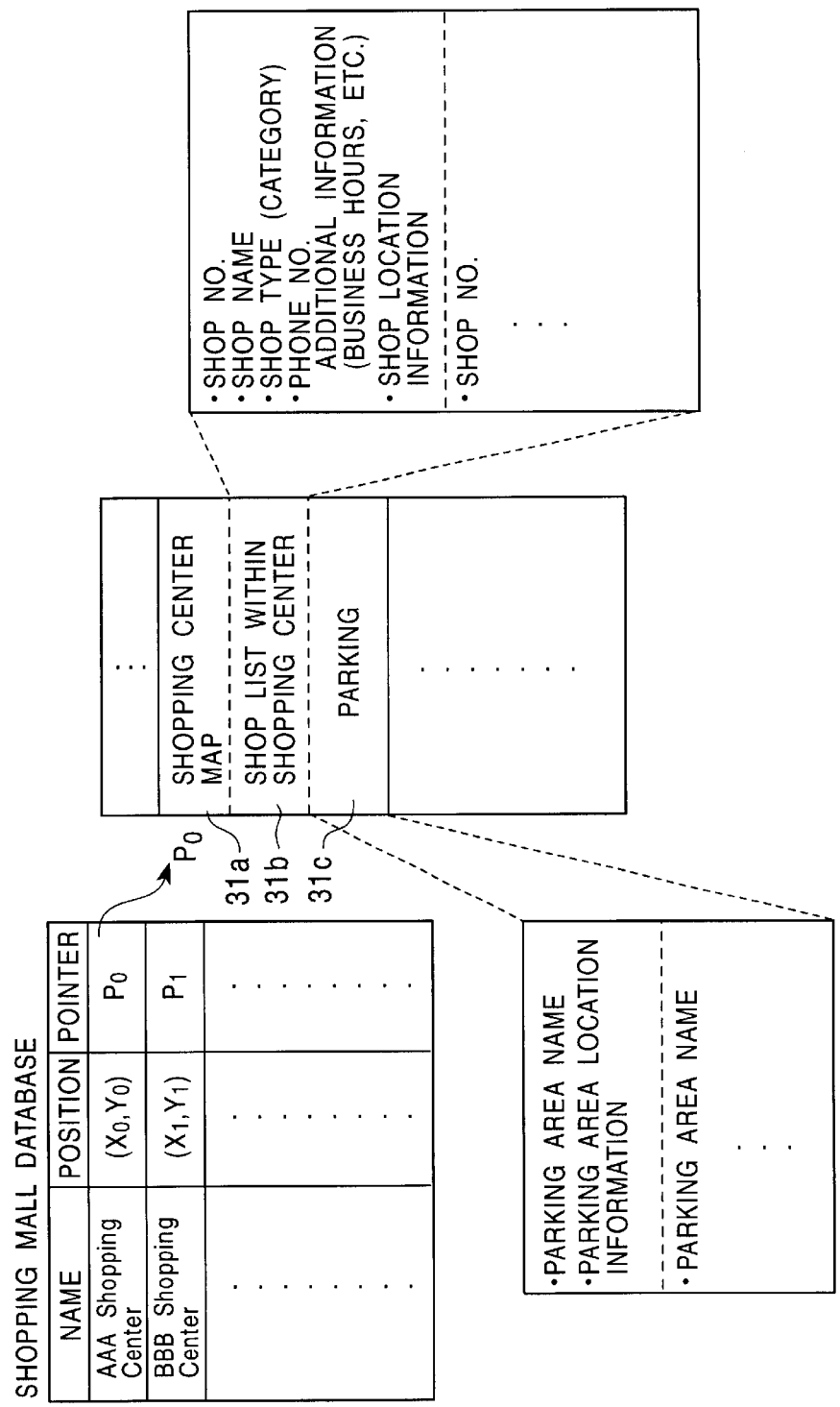
FIG. 9 is an explanatory diagram of a shopping mall database for use in an embodiment of the present invention.

The shopping mall database 31 has a hierarchical configuration as shown in FIG. 9, with the position of malls and pointers are stored in accordance with shopping mall names, and the pointers indicate the positions for storing the detailed shopping mall information. The detailed information is made up of (1) detailed maps 31a of shopping malls, (2) lists 31b of stores in the shopping malls, and (3) lists 31c of parking areas. The detailed shopping mall maps 31a contain positions and shapes of the buildings, store shapes indicating the store layouts on each floor of the buildings, names of the stores, parking areas, and lanes within the mall. The shopping mall store lists 31b contain the store number, store name, store type, phone number, store position, and additional store information (e.g., business hours), for each store. The parking area lists 31c contain the names of parking areas, the position of parking areas, and the maximum number of cars which can be parked in the parking areas.

(b) Detailed Display Control of Shopping Mall due to Vehicle Entrance

Figure 10A:
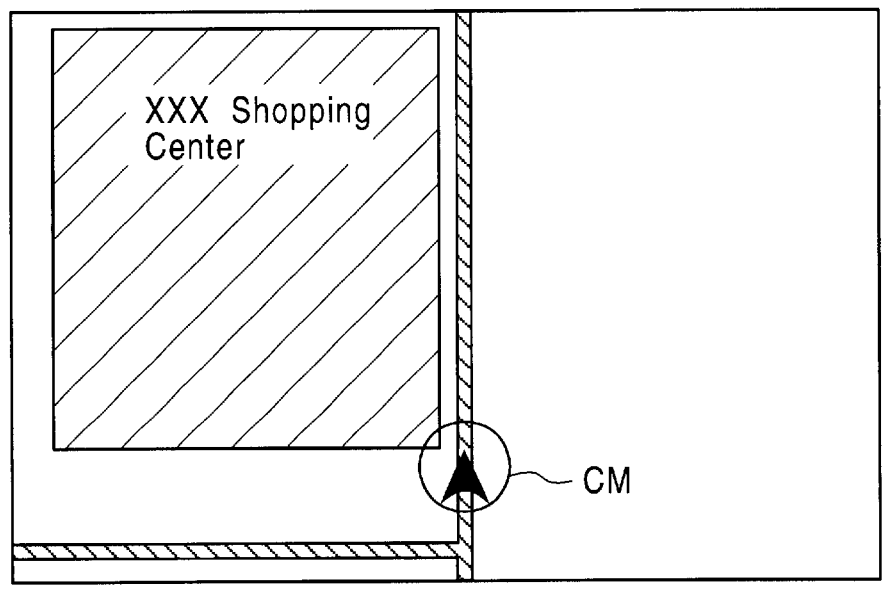
FIGS. 10A and 10B show an example of a detailed display within a shopping mall from vehicle entrance for use in an embodiment of the present invention.
Figure 10B:
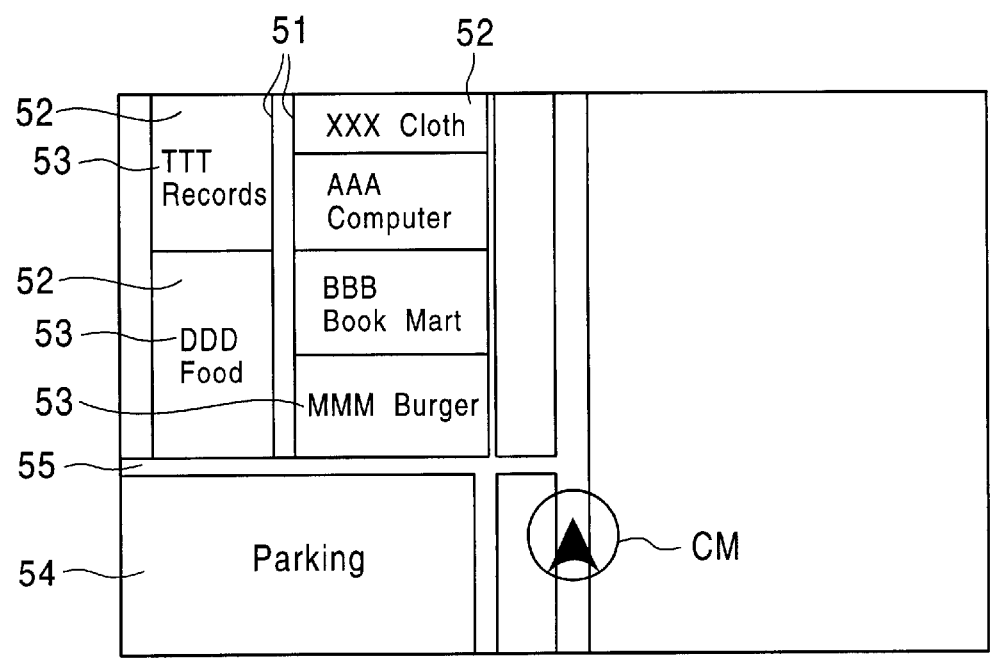
Figure 11:
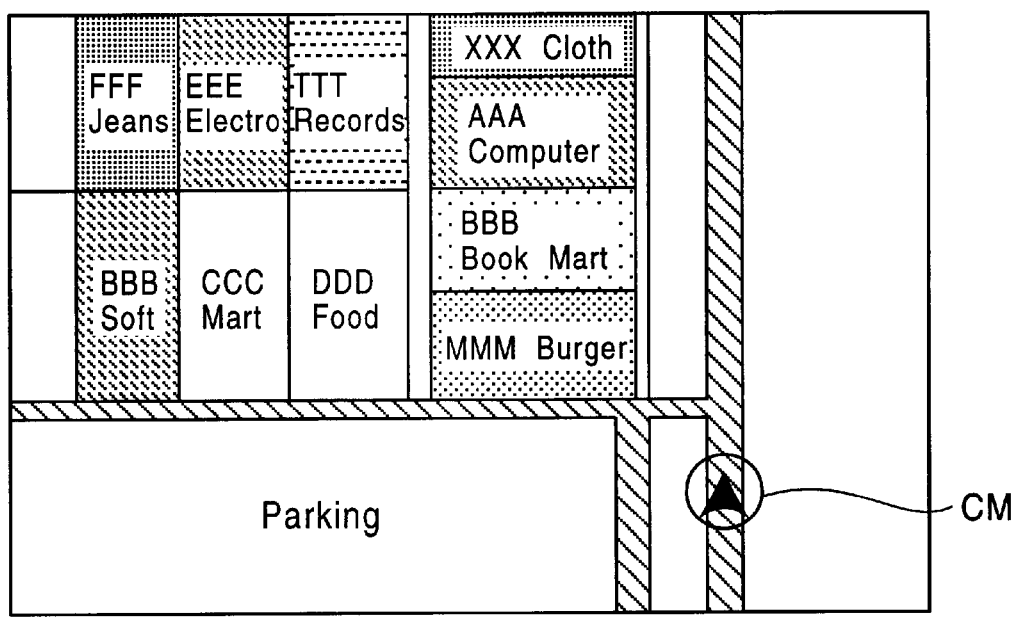
FIG. 11 is a color-coded display according to store type for use in an embodiment of the present invention.

FIGS. 10A and 10B comprise an example of detailed display of a shopping mall due to entrance of the vehicle, and FIG. 11 is a variation example wherein the stores within the shopping mall are identified and displayed by color coding according to the type of store. In the event that the vehicle drives from the position shown in FIG. 10A and enters the shopping mall (XXX Shopping Center), the navigation control unit (CPU 17) displays a detailed map of the shopping mall, as shown in FIG. 10B. This detailed map contains building plan views 51, store shapes (store polygons) 52 indicating the store layouts of each the building, store names 53, parking areas 54, and lanes 55 within the mall and the like. An example of a variation of this detailed map display is an arrangement wherein the stores within the shopping mall are color-coded based on the type of store, as shown in FIG. 11.

FIGS. 12 and 13 are flowcharts of the detailed display of the shopping mall from entrance of the vehicle. The navigation control unit (CPU 17) checks whether or not the vehicle has entered the shopping mall by referring to the vehicle position and the shopping mall area information (act 151), and in the event that the vehicle has entered, detailed information regarding the shopping mall which the vehicle has entered is obtained from the shopping mall database 31 (act 152), and a detailed map of the shopping mall as shown in FIG. 10B is displayed (act 153).

In order to make color-coded display according to store type, following the processing in act 153, the store type contained in the detailed information of the shopping mall is judged as shown in act 154 in FIG. 13, and the store polygons are filled in with color corresponding to the store type (FIG. 11).

Thus, at the time of the vehicle entering the shopping mall, the driver can readily recognize where desired stores and facilities, parking, and exits are within the shopping mall. Particularly, color coding the stores allows desired stores to be found easily.

(c) Detailed Display Control of Shopping Mall due to Cursor Entrance

Figure 14A:
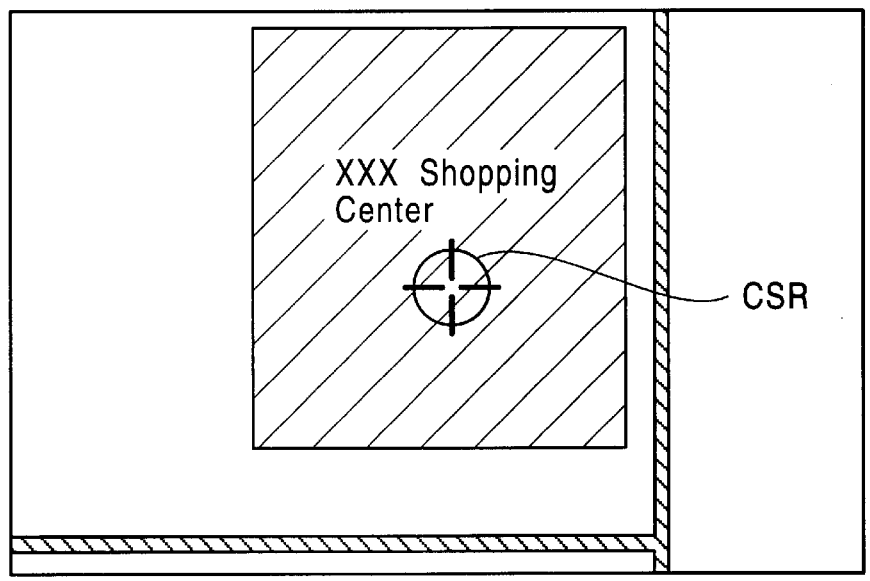
FIGS. 14A and 14B show an example of detailed display within the shopping mall from entrance of cursor for use in an embodiment of the present invention.
Figure 14B:
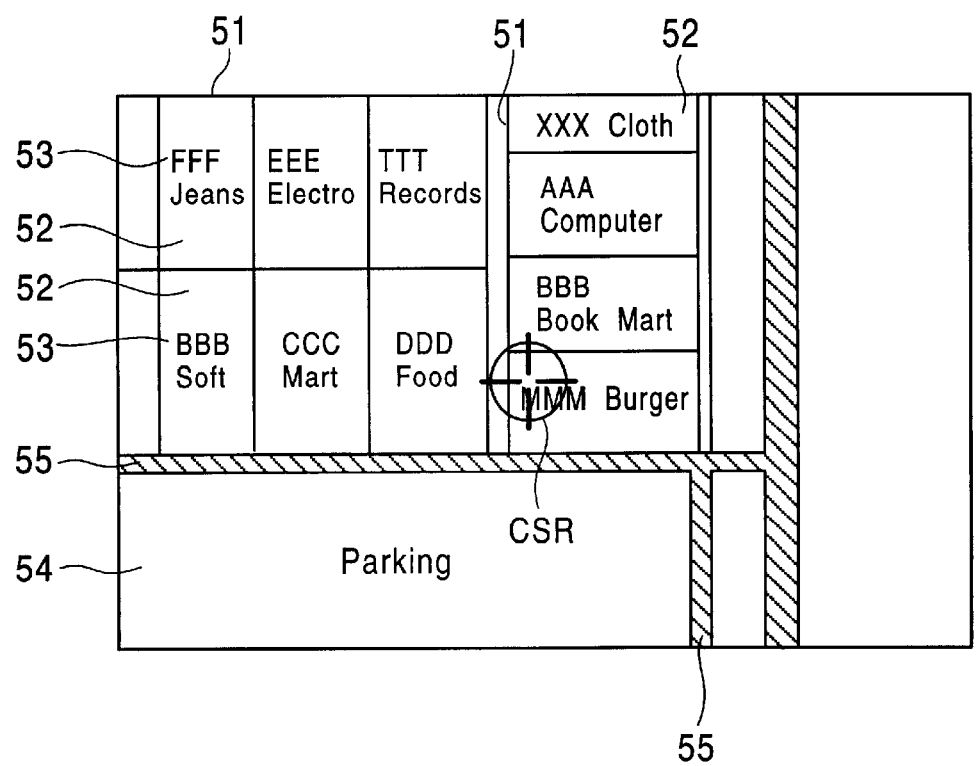
Figure 15:
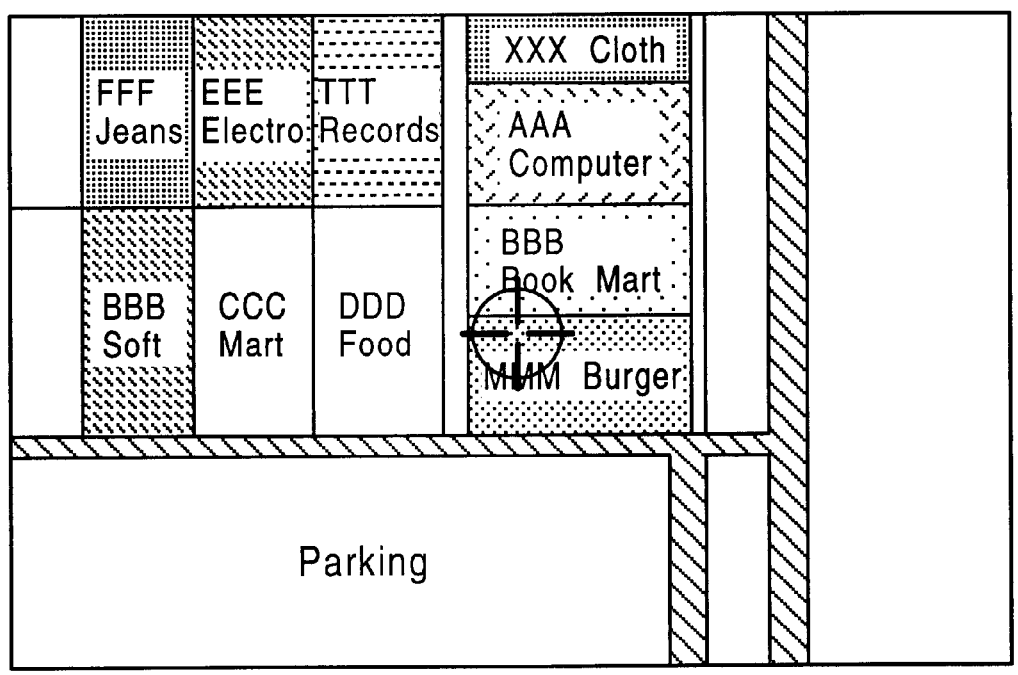
FIG. 15 shows an example of color-coded display according to store type for use in an embodiment of the present invention.

FIGS. 14A and 14B comprise an example of detailed display of a shopping mall due to entrance of the cursor, and FIG. 15 is a variation example wherein the stores within the shopping mall are identified and displayed by color coding according to the type of store. In the event that the cursor CSR is moved into the shopping mall (XXX Shopping Center) as shown in FIG. 14A, the navigation control unit (CPU 17) displays a detailed map of the shopping mall, as shown in FIG. 14B. This detailed map contains building plan views 51, store shapes (store polygons) 52 indicating the store layouts of each the building, store names 53, parking areas 54, and lanes 55 within the mall and the like. An example of a variation of this detailed map display is an arrangement wherein the stores within the shopping mall are color-coded based on the type of store, as shown in FIG. 15.

FIGS. 16 and 17 are flowcharts of the detailed display of the shopping mall from entrance of the cursor. Moving the cursor CRS by operating the remote control actually fixes the cursor in the center of the screen and scrolls the map (act 201). The navigation control unit checks whether or not the cursor has entered the shopping mall (act 202), and in the event that the cursor has entered, detailed information regarding the shopping mall which the cursor has entered is obtained from the shopping mall database 31 (act 203), and a detailed map of the shopping mall as shown in FIG. 14B is displayed (act 204).

In order to make color-coded display according to store type, following the processing in act 204, the store type contained in the detailed information of the shopping mall obtained in act 203 is referred to as shown in act 205 in FIG. 17, and the store polygons are filled in with color corresponding to the store type, i.e., color-coded (FIG. 15).

Thus, according to an embodiment of the present invention, at the time of the cursor entering the shopping mall, the driver can readily recognize where desired stores and facilities, parking, and exits are within the shopping mall. Consequently, the user can scroll the map outside of the shopping mall and set stores and facilities within the shopping mall as destinations, thereby allowing the navigation device to guide the vehicle by route to the destination stores and facilities. In this case, color coding the stores according to store type allows desired stores to be found easily, and also changes to destinations can be easily made.

Figure 18A:
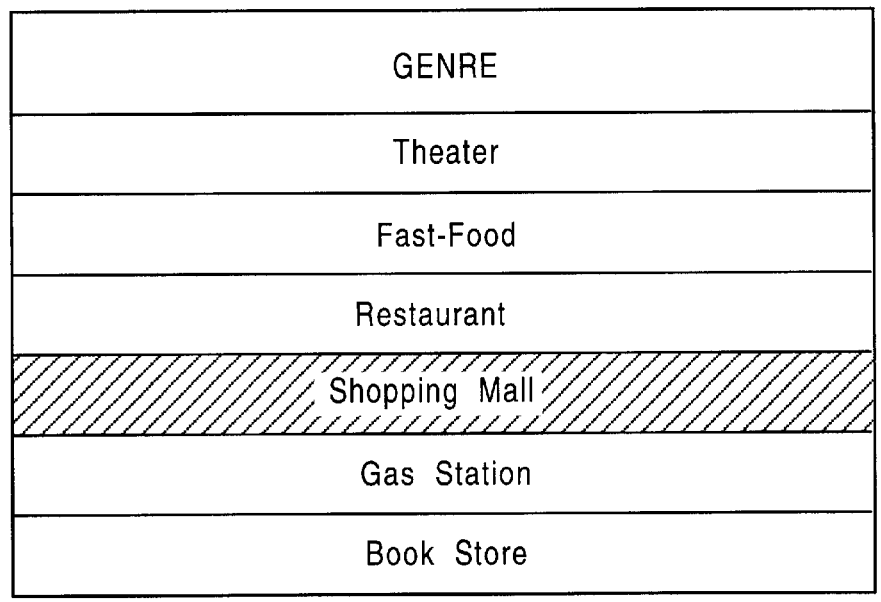
FIG. 18 shows an example of detailed display of within the shopping mall by destination setting by genre for use in an embodiment of the present invention.
Figure 18B:
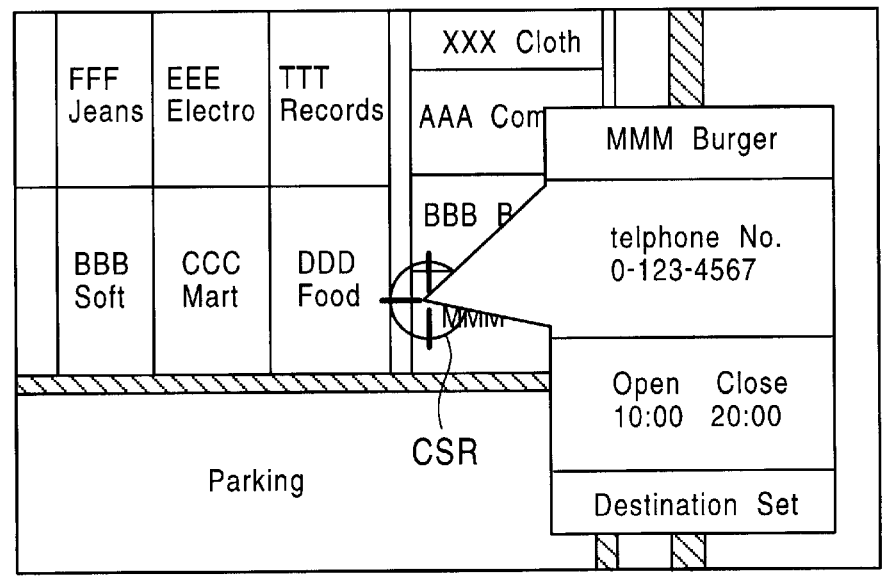

(d) Detailed Display of Shopping Mall According to Destination Settings by Genre FIGS. 18A and 18B are display examples of a detailed map of a shopping center according to destination settings by genre, and FIG. 19 is the display control flow thereof.

Selecting the destination-by-genre setting mode by menu operation of the remote control 15 (act 251) causes the navigation control unit to display a genre name list on the display unit 26, as shown in FIG. 18A (act 252).

Selecting "shopping mall" from this genre name list (act 253) causes the navigation control unit to make reference to the shopping mall database information and search for a shopping mall closest to the position of the vehicle (act 254). Also, a configuration may be made wherein a shopping mall list is displayed, so that the user can select a desired shopping mall.

Once the closest shopping mall is found, the navigation control unit obtains detailed information of the shopping mall from the shopping mall database 31, and displays a detailed shopping mall map and the cursor CSR, as shown in FIG. 18B (act 255). The detailed map contains building plan views, store shapes (store polygons) indicating the store layouts of each the building, store names, parking areas, and lanes within the mall and the like.

Next, moving the cursor CRS to the desired store by operating the remote control and selecting the position thereof causes the navigation control unit to bring up an enlarged display of detailed information of the store (the store name, phone No., business hours, etc.) (act 257). In the event that this selected store is the desired store, the user inputs an OK for destination setting (act 258). Thus, the navigation control unit finds a parking area closest to the desired store, searches a route to this parking area from the vehicle position, and displays it (act 259). Also, the stores can be color-coded based on store type (category) in act 257.

According to one embodiment, desired stores and facilities within the shopping mall can be readily found outside of the shopping mall, and can be set as destinations.

(e) Detailed Display of Shopping Mall by Alphabetical Search of Store Name

Figure 20A:
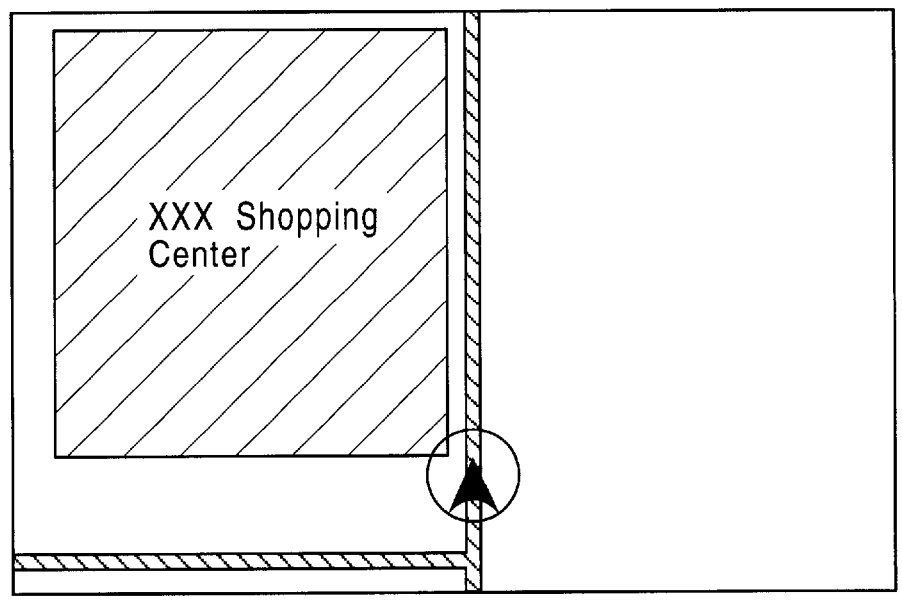
FIGS. 20A and 20B show an example of display from an alphabetical search of store names within the shopping mall for use in an embodiment of the present invention.
Figure 20B:
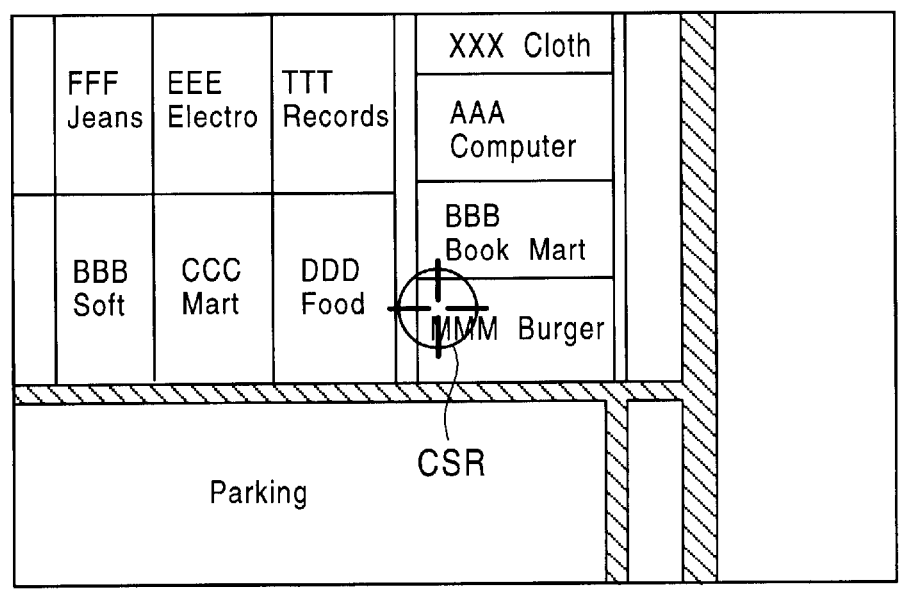
Figure 21:
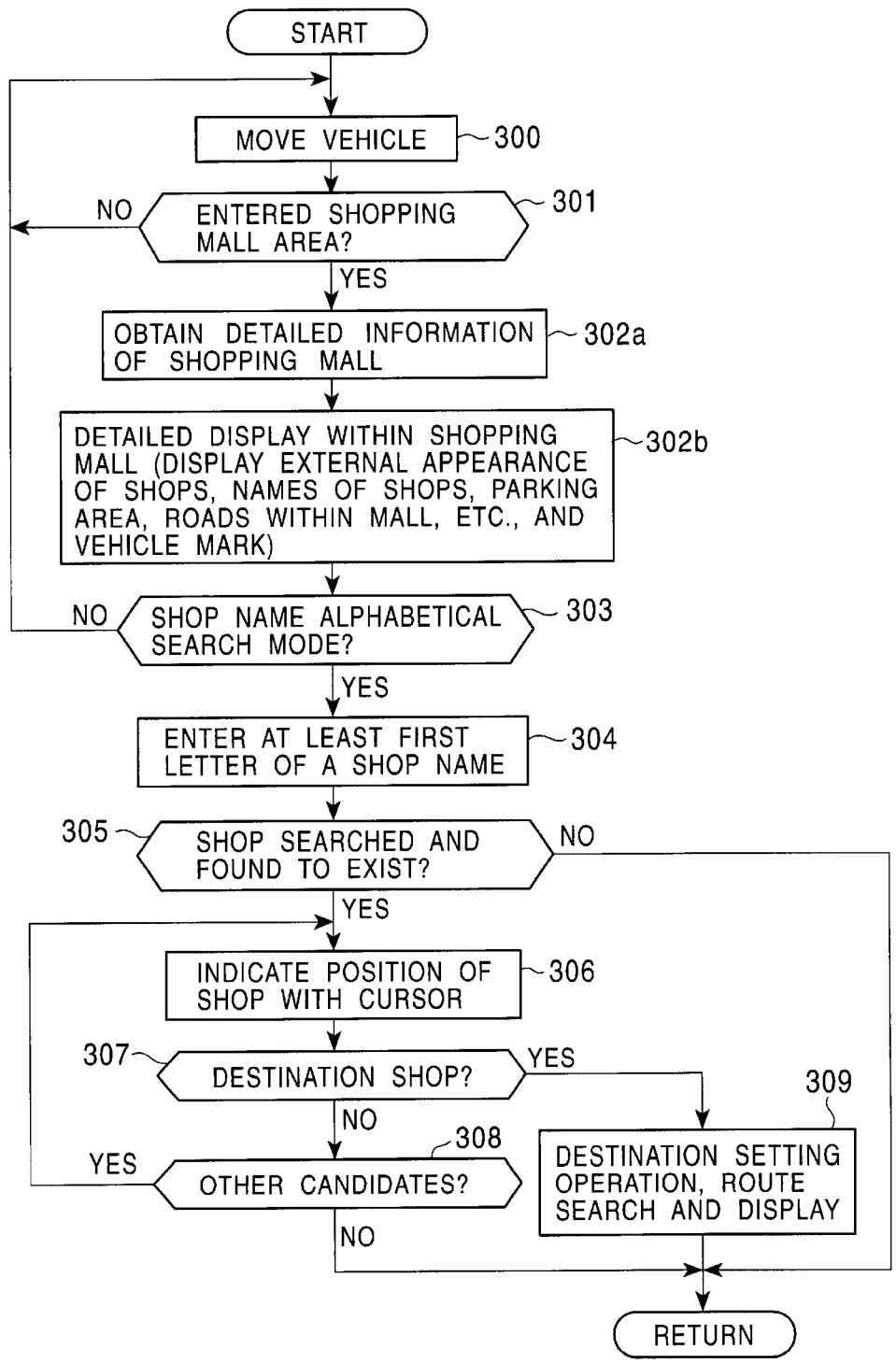
FIG. 21 is a display of an alphabetical search of store names within the shopping mall for use in an embodiment of the present invention.

FIGS. 20A and 20B are examples of display of searching for desired stores and facilities by inputting at least the first letter of a store name in the alphabetical search mode, and FIG. 21 is the display control flow thereof.

In the event that the vehicle moves (act 300), the navigation control unit checks whether or not the vehicle has entered the shopping mall by referring to the vehicle position and the shopping mall area information (act 301), and in the event that the vehicle has entered the shopping mall, detailed information regarding the shopping mall is obtained from the shopping mall database 31 (act 302a), and a detailed map of the shopping mall is displayed (act 302b).

Next, the navigation control unit checks whether or not the mode is the store name alphabetical search mode (act 303). In the event that the user operates to the remote control and sets the mode to the store name alphabetical search mode, and then enters at least the first letter of a store name (act 304), the navigation control unit searches the database information and checks whether or not a corresponding store exists (act 305). In the event that no corresponding store exists, the search processing is ended and the flow returns to the beginning, and in the event that a corresponding store does exist, the store is indicated with the cursor CSR (act 306). In the event that the store indicated by the cursor is the destination store (act 307), the user performs a configuring operation, following which the navigation control unit finds a parking area closest to the desired store, searches a route to this parking area from the vehicle position, and displays it (act 309).

On the other hand, in the event that the store in act 307 is not the desired store, a check is made regarding whether or not another store with the input letter exists (act 308); in the event that another store with the letter does not exist the searching processes ends and returns to the beginning, and in the event that another store with the letter does exist, the processing from act 306 on is repeated.

According to one embodiment, the position of desired stores and facilities can be readily found by entering at least the first letter of the name of the store or facility in the event the user knows the name, and thus route guiding can be made to this position.

(f) Position Display of Destination Stores by Type of Store

Figure 22A:
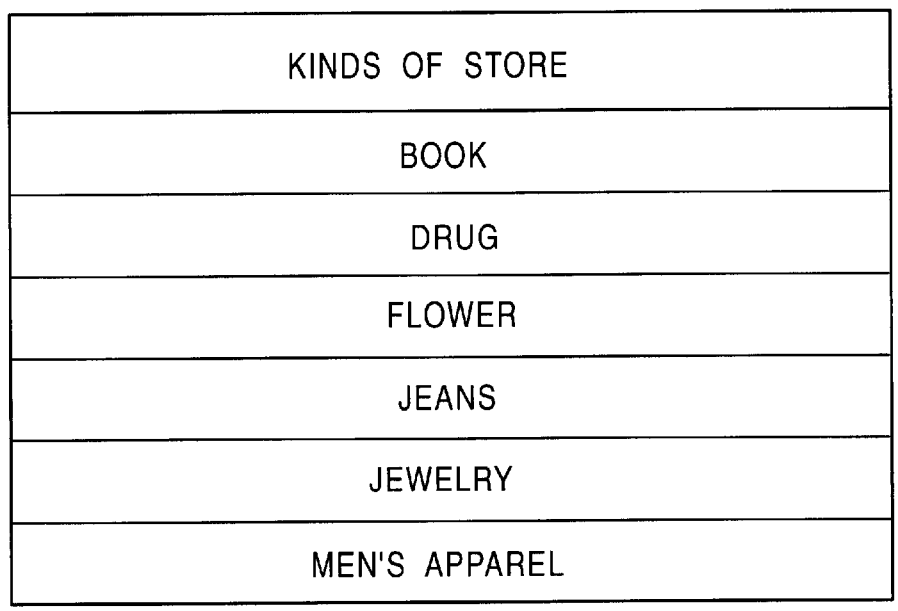
FIGS. 22A and 22B show an example of displaying a destination store position by store type for use in an embodiment of the present invention.
Figure 22B:
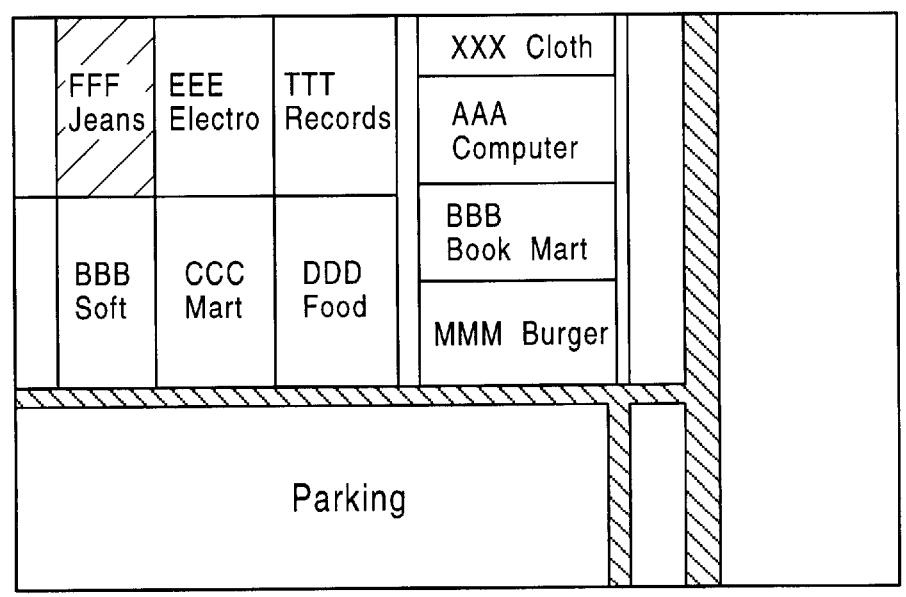

FIGS. 22A and 22B are examples of displaying the position of a store by inputting the type of the desired store, and FIG. 23 is the display control flow thereof.

In the event that the vehicle moves (act 351), the navigation control unit checks whether or not the vehicle has entered the shopping mall by referring to the vehicle position and the shopping mall area information (act 352), and in the event that the vehicle has entered the shopping mall, detailed information regarding the shopping mall into which the vehicle has entered is obtained from the shopping mall database 31, and a detailed map of the shopping mall and the vehicle mark CM is displayed, as shown in FIG. 10B is displayed (act 353).

Next, the navigation control unit checks whether or not the mode is the store type search mode (act 354). In the event that the user operates to the remote control and sets the mode to the store type search mode, the navigation control unit displays a store type list, as shown in FIG. 22A (act 355). Then, in the event that the user selects and inputs the desires store type from the list (act 356), the navigation control unit makes reference to the database information and searches for the input store type (e.g., jeans) in, and makes color-coded display of the store polygon different from that of the other store polygons, as shown in FIG. 22B (act 357). Though FIG. 22A only shows a few store types, the other store types can be displayed by scrolling.

(g) Floor Switchover Display

Figure 24A:
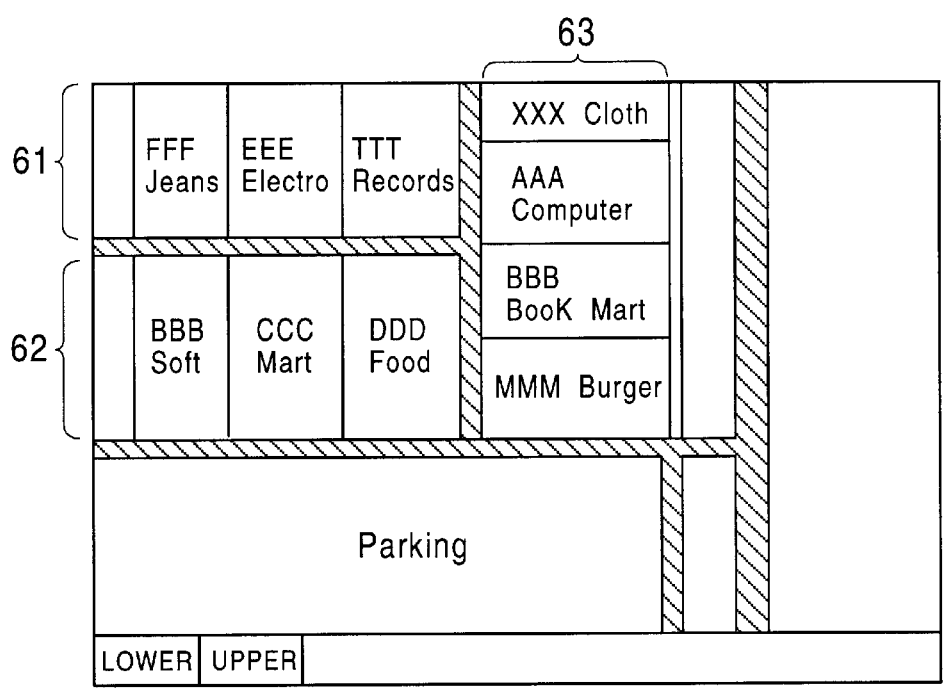
FIGS. 24A and 24B show floor switchover display for use in an embodiment of the present invention.
Figure 24B:
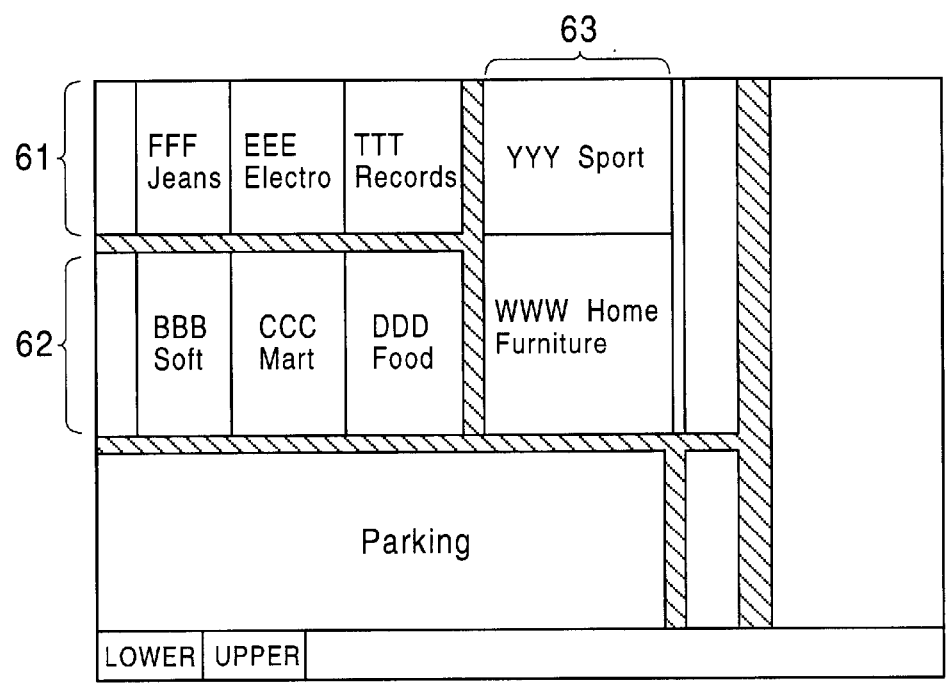
Figure 25:
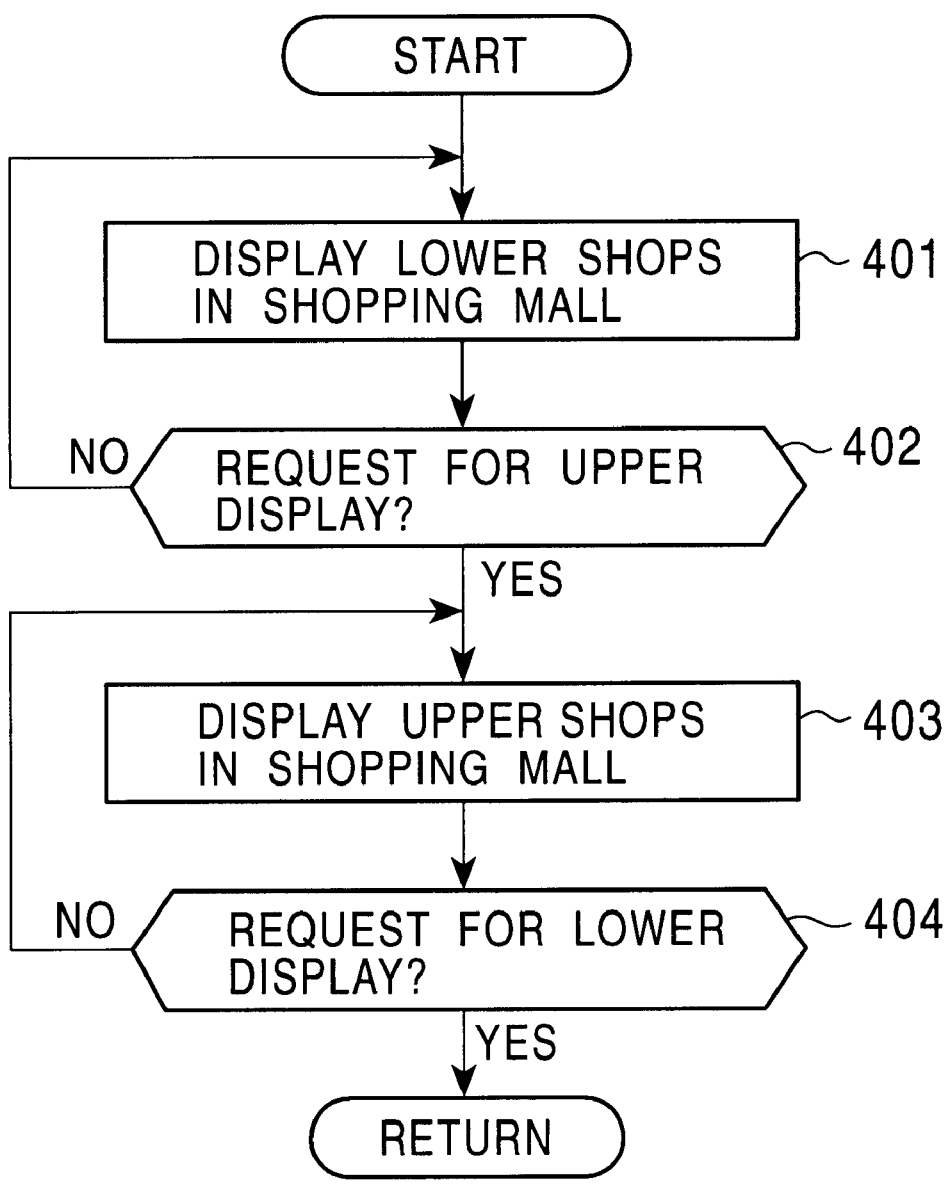
FIG. 25 shows first floor/second floor store switchover display control for use in an embodiment of the present invention.

FIGS. 24A and 24B are examples of a display in the event of displaying building plan views, store plan views, and store names, using detailed maps of a specified floor. Here, FIG. 24A is an example of display of the first floor using a detailed map, and FIG. 24B is an example of display of the second floor using a detailed map. Note that the buildings 61 and 62 are ground level buildings, while building 63 is a two-story building.

Initially, the navigation control unit displays the detailed map of the first floor portion of the shopping mall, as shown in FIG. 24A (act 401). In this state, in the event that "upper" is selected from the menu (act 402), the navigation control unit reads the detailed map for the second floor from the database 31 and displays this, as shown in FIG. 24B (act 403). In the state of displaying the second floor, in the event that "lower" is selected from the menu (act 404), the flow returns to act 401 and the navigation control unit displays the detailed map for the first floor. The above is an example wherein the uppermost floor is the second floor, but in cases where there are more floors, the detailed maps of desired floors can be displayed by sequentially selecting "upper" or "lower".

According to the present embodiment, the user can grasp the layout of stores and facilities on each floor in buildings with multiple floors, which is advantageous.

(h) Guided Route Display to Nearest Parking Area

Figure 26:
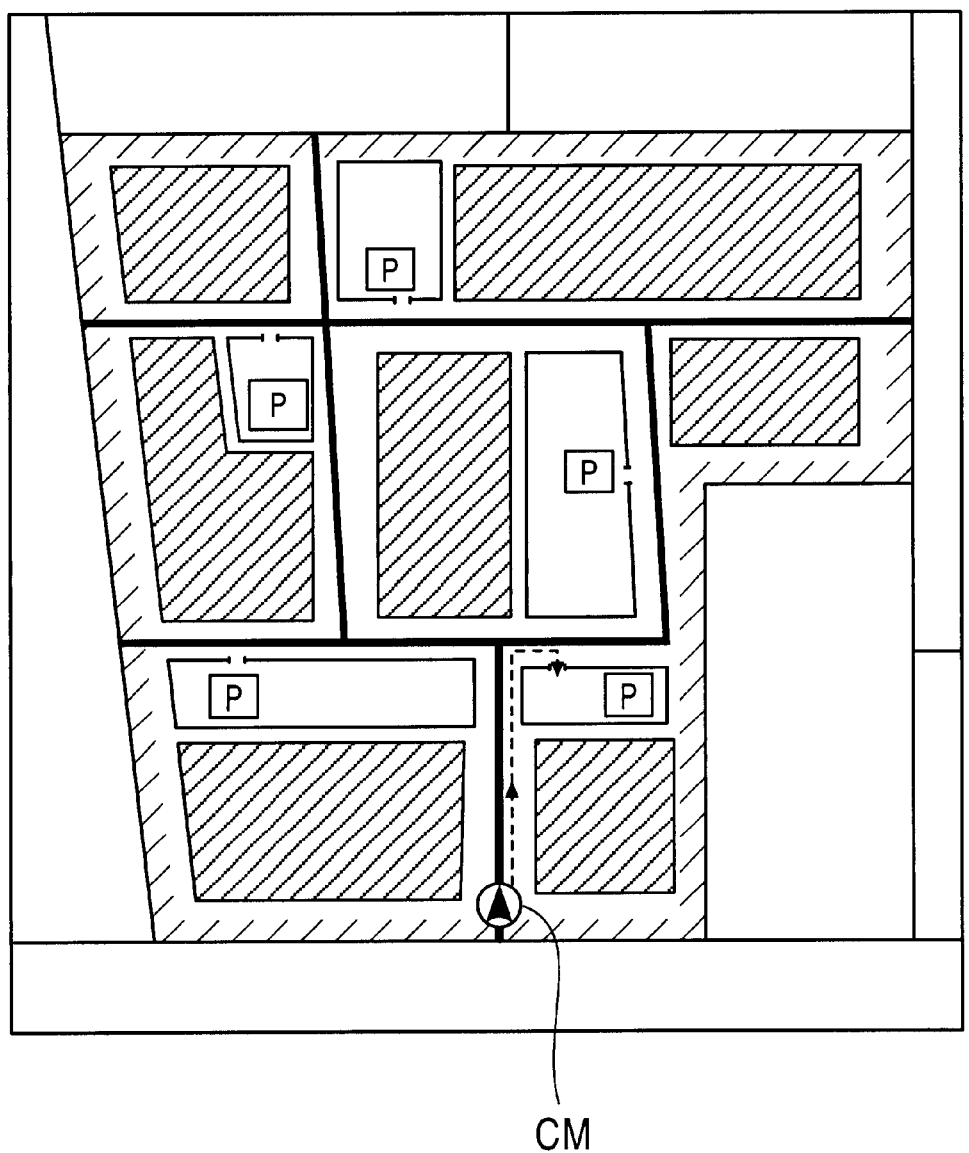
FIG. 26 is a guiding route display to the nearest parking area for use in an embodiment of the present invention.
Figure 27:
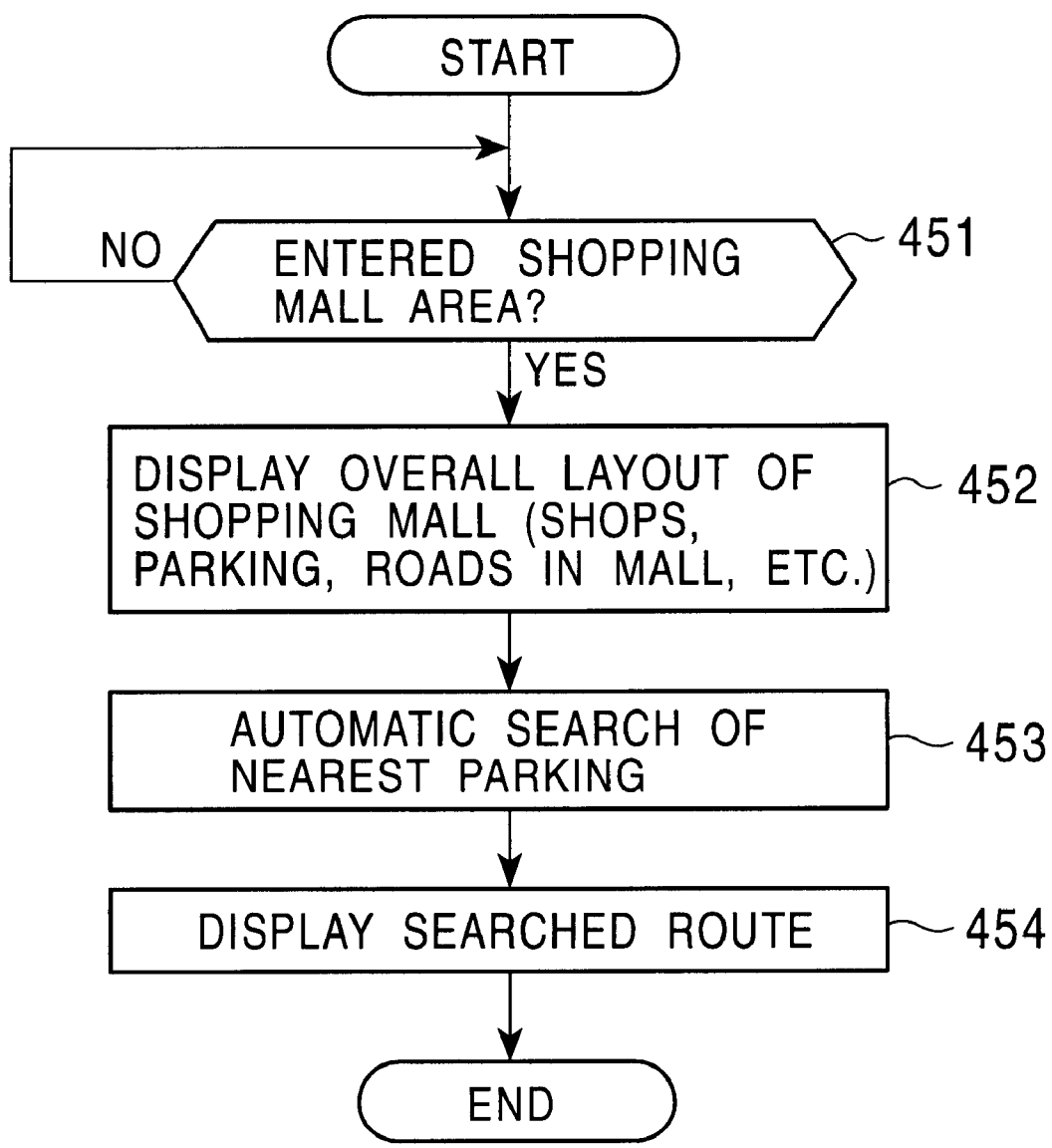
FIG. 27 is a route search display to the nearest parking area for use in an embodiment of the present invention.

FIG. 26 is an example of display for automatically performing route guiding to the closest parking area to the entrance following entering a shopping mall, and FIG. 27 is the processing flow thereof.

In the event that the vehicle moves, the navigation control unit checks whether or not the vehicle has entered the shopping mall by referring to the vehicle position and the shopping mall area information (act 451), and in the event that the vehicle has entered the shopping mall, detailed information regarding the shopping mall into which the vehicle has entered is obtained from the shopping mall database 31, and a detailed overall layout (plan views of buildings, parking areas, lanes within the mall, etc.) of the shopping mall and the vehicle mark CM are displayed, as shown in FIG. 26 (act 452). Next, the parking area closest to the entrance is automatically searched from the parking information (act 453), and the closest route to this parking area is searched and displayed (act 454).

Shopping malls tend to be vast, with many one-way lanes and many parking areas. According to one present embodiment, route guiding to the nearest parking area at the time of entering the parking area is automatic. In one embodiment, in the event that the destination store is set before entering the shopping mall, this function is not carried out.

(i) Guided Route Display to Exit

Figure 28:
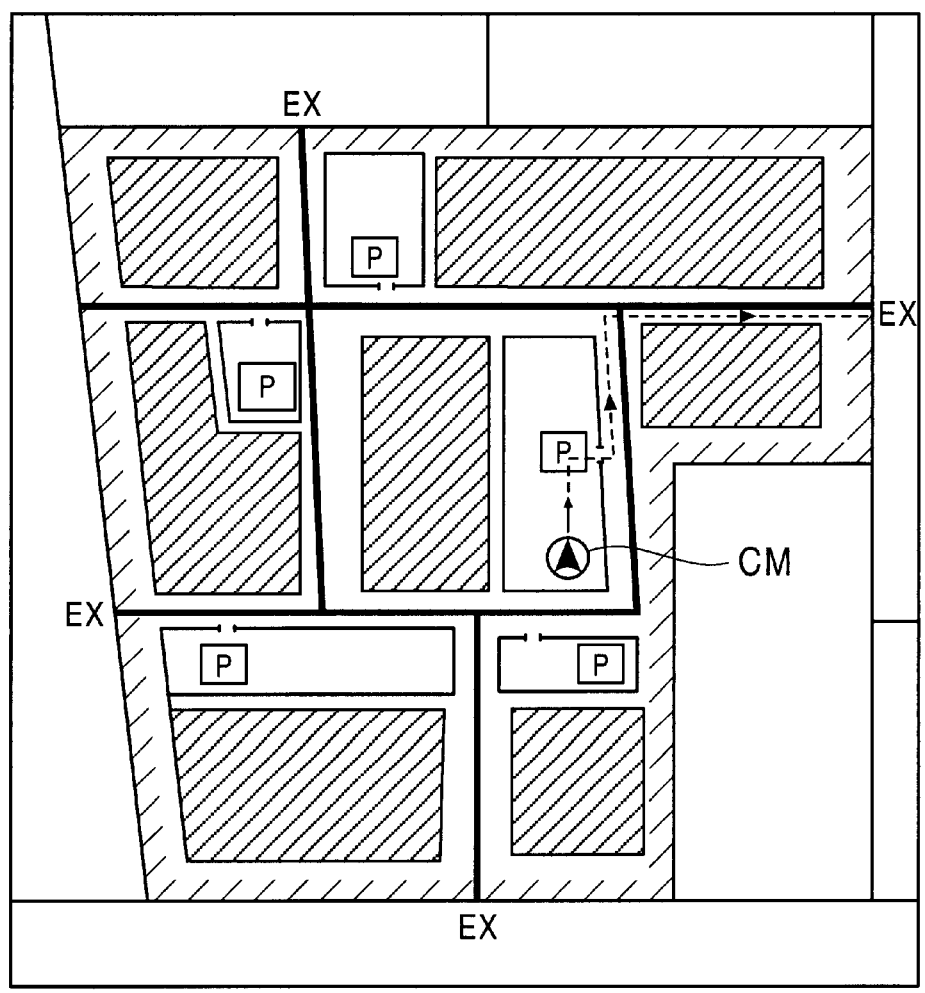
FIG. 28 is a guiding route display to the nearest exit for use in an embodiment of the present invention.
Figure 30A:
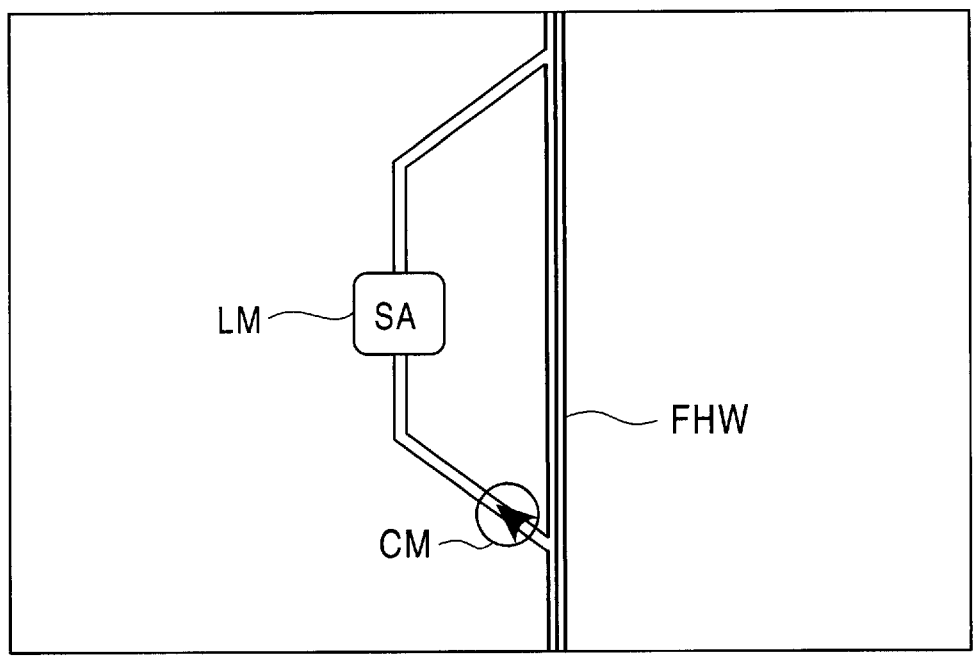
FIGS. 30A and 30B are explanatory diagrams of route guiding on a freeway according to a convention navigation device.
Figure 30B:
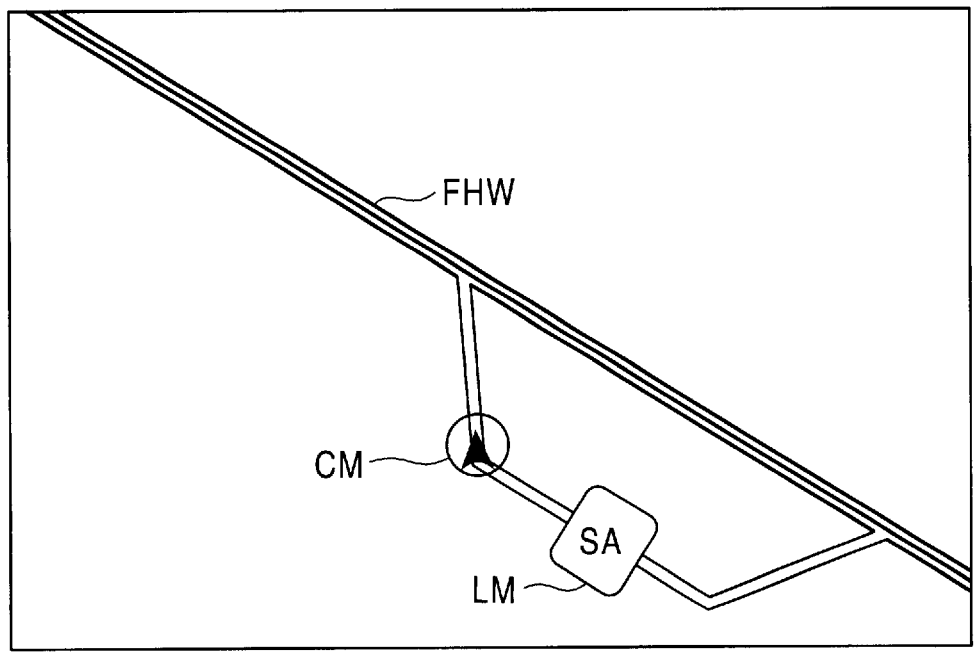

FIG. 28 is an example of display for searching for a route to the nearest exit from the current position at the time of turning the power of the navigation device on, and FIG. 29 is the processing flow for searching for the exit and displaying the route to the exit.

In the event that the power of the navigation device is turned on (act 501), the navigation control unit checks whether or not the vehicle is in a parking area (act 502), and in the event that the vehicle is not in a parking area normal operations are executed.

However, in the event that the vehicle is in a parking area of a shopping mall, detailed information regarding the shopping mall is obtained from the database, and a detailed overall layout (plan views of buildings, parking areas, lanes within the mall, exits EX, etc.) of the shopping mall and the vehicle mark CM are displayed, as shown in FIG. 28 (act 503). Next, the navigation control unit checks whether or not a destination is set (act 504), and in the event that a destination is set, the navigation control unit obtains the exit on the shortest route to the destination from the current position (act 505), and displays the route to the exit so as to guide the driver (act 506).

On the other hand, in the event that the destination is not set in act 504, judgment is made whether or not to manually select the exit with the cursor (act 507), and in the event of setting the destination manually, the cursor is positioned at the desired exit and the destination is set (act 508). Thus, the navigation control unit searches the route to the set exit, and performs guiding by displaying the route (act 506).

Also, in the event of automatically searching the route to the nearest exit in act 507, selection is made to that end. Consequently, the navigation control unit finds the nearest exit from the current position (act 509), searches the route to the set exit, and performs guiding by displaying the route on the display unit (act 506).

According to one embodiment, at the time of turning on the power for the navigation device in the parking area, i.e., at the time of starting the engine of the vehicle to leave, which turns on the power for the navigation device, one of the following is searched and displayed: (1) the route to an exit selected with the cursor; (2) the route to the nearest exit from the current position in the parking area, automatically; or (3) the route to the exit on the shortest route to a destination.

Thus, according to and embodiment of the present invention, in the event that the vehicle enters an area, detailed map information of inside freeway service areas and parking areas is provided, and detailed maps of within such an area are displayed, thereby displaying where what is, and where the vehicle is within the area, in a manner readily understood.

Also, according to an embodiment of the present invention, rerouting calculations are performed in the event that the vehicle enters an area and a guiding route is displayed, thereby allowing the vehicle to smoothly return to the freeway which is the guided route.

Also, according to an embodiment of the present invention, the exit area is displayed in an enlarged manner in the event that the distance from the vehicle position to the area exit is equal to or less than a certain distance while driving along the guiding route within the area, and also the direction of progression is displayed, thereby allowing the formation of the exit to be displayed in a readily understood manner when the vehicle approaches the exit from within the area.

Also, according to an embodiment of the present invention, a detailed map of inside the shopping mall is displayed using database information in the event that the vehicle or cursor enters a shopping mall, thereby displaying where desired stores and facilities, parking areas, and exits are within the shopping mall are, in a manner readily recognized.

Also, according to an embodiment of the present invention, the store polygons can be displayed color-coded according to type of store, detailed maps can be displayed by floor, and searches can be performed by store name or store type, thereby allowing the position of desired stores and facilities to be readily recognized, and allowing these to be readily set as destinations.

Also, according to an embodiment of the present invention, the shortest route to the parking area nearest to the destination store or facilities, the route to an exit set from the parking area, and the route to the nearest exit or the like are each searched and the route guiding is performed, so the driver can reach the destination without getting lost, even within a vast shopping mall.

Also, according to an embodiment of the present invention, stores and facilities within a shopping mall can be set as destinations outside of the shopping mall, so route guiding toward the destination stores and facilities can be performed.

What is claimed is:

1. A navigation device having route guiding functions for searching a route to a destination and guiding a vehicle along said route, said navigation device comprising:

a storing unit for storing detailed map information of freeway service areas, the detailed map information of freeway service areas including entrance, exit and parking location information;

a control unit in communication with said storing unit and operable to control the display of said detailed map information of freeway service areas when said vehicle enters a freeway service area from a freeway that is included in a guiding route; and a display unit in communication with said control unit and operable to display a detailed map of said freeway service area utilizing said detailed map information.

2. The navigation device of claim 1 wherein said control unit performs rerouting calculations and displays a guiding route on said display unit when said vehicle enters said freeway service area.

3. The navigation device of claim 1 wherein said control unit displays an enlarged image of an exit area and a direction of progression on the display unit when said vehicle is less than a predetermined distance from said exit area and while said vehicle is driving along said guiding route within said area.

4. A navigation device having route guiding functions for searching a route to a destination and guiding a vehicle along said route, said navigation device comprising:
    a storing unit for storing detailed map information of parking areas, the detailed map information of parking areas including entrance, exit and parking location information;
    a control unit in communication with said storing unit and operable to control the display of said detailed map information of parking areas when said vehicle enters a parking area from a freeway that is included in a guiding route; and
    a display unit in communication with said control unit and operable to display a detailed map of said parking area utilizing said detailed map information.

5. The navigation device of claim 1 wherein said control unit performs rerouting calculations and displays a guiding route on said display unit when said vehicle enters said parking area.

6. The navigation device of claim 1 wherein said control unit displays an enlarged image of an exit area and a direction of progression on the display unit when said vehicle is less than a predetermined distance from said exit area and while said vehicle is driving along said guiding route within said area.

7. A navigation device having route guiding functions for searching a route to a destination and guiding a vehicle along said route, said navigation device comprising:
    a database for storing detailed maps and store lists of shopping malls;
    a position detecting unit for detecting a position of said vehicle;
    a control unit in communication with said database and said position detecting unit and operable to control the display of a detailed map of a shopping mall using said database information when said vehicle is inside a shopping mall; and
    a display unit in communication with said control unit and operable to display said detailed map of a shopping mall.

8. The navigation device of claim 7 wherein said store list comprises a store name, store type, and store position information and wherein said display control unit identifies and displays stores in the shopping mall on said display unit in color according to the type of store.

9. The navigation device of claim 7 wherein said store list comprises a store name and store position information and wherein said control unit searches for a store having a first letter that is the same as a first letter inputted into said navigation device and displays a position of said store with a cursor on said display unit.

10. The navigation device of claim 7 wherein said store list comprises a store name, store type, and store position information for each store, and in the event that a store type is inputted in a store type search, said control unit makes reference to said store list and displays stores of the input store type on the display unit in an identifiable manner.

11. The navigation device of claim 7 wherein said control unit automatically searches for and displays on said display unit a route to a nearest parking area.

12. The navigation device of claim 7 wherein said control unit searches for a route to a nearest exit from a current position and displays said route to the exit on said display when said navigation device is turned on within a parking area.

13. The navigation device of claim 7 wherein said control unit displays a map of said shopping mall and at least one exit of said shopping mall, searches for a route to a selected exit, and displays said route to a selected exit on said display unit.

14. The navigation device of claim 7 wherein in the event that a particular store is set as a destination store, said control unit searches for a route to a parking area nearest to destination store and displays said route to a parking area nearest to said destination store on the display unit.

15. A navigation device having route guiding functions for searching a route to a destination and guiding a vehicle along said route, said navigation device comprising:
    a database for storing detailed maps and store lists of shopping malls;
    a control unit in communication with said database and operable to control the display of a detailed map of a shopping mall using said database information when said shopping mall is set as a destination; and
    a display unit for displaying said detailed map of a shopping mall.

16. The navigation device of claim 15 wherein said control unit searches for a route to a parking area nearest to a destination store and displays said route to a parking area nearest to a destination store on said display unit.

17. A navigation device having route guiding functions for searching a route to a destination and guiding a vehicle along said route, said navigation device comprising:
    a database for storing detailed maps and store lists of shopping malls;
    a cursor motion control unit operable to display a cursor at a predetermined position on a display unit and relatively move a map with respect to said cursor;
    a control unit in communication with said database and said cursor motion control unit and operable to control display of a detailed map of inside said shopping mall using said database information when said cursor enters the shopping mall; and
    a display unit in communication with said control unit and operable to display said detailed map of inside said shopping mall.

18. The navigation device of claim 17 wherein said control unit searches for a route to a parking area nearest to a destination store and displays said route to a parking area nearest to a destination store on the display unit.

19. A navigation device according to claim 17 wherein said control unit displays store forms and store names on the display unit according to the a specified floor using the detailed map information including detailed maps for each floor.

20. A route guiding method for a navigation device in a shopping mall, said route guiding method comprising the acts of:
    providing detailed maps of shopping malls and store lists in a database;
    detecting a vehicle position;

determining whether the detected vehicle position has entered into a shopping mall;

retrieving detailed maps of said shopping mall from said database when said vehicle is proximate to an entrance of said shopping mall; and displaying said detailed maps on a display unit.

21. The route guiding method for a navigation device in a shopping mail of claim 20 further comprising the acts of automatically searching for a route to a nearest parking area and displaying said route on said display unit.

22. The route guiding method for a navigation device in a shopping mall of claim 20 further comprising the acts of searching for a route to a nearest exit from a current position when said navigation device is turned on within a parking area and displaying said route on said display unit.

23. The route guiding method for a navigation device in a shopping mall of claim 20 further comprising the acts of displaying a map of an overall shopping area and one or more exits of said shopping mall when said navigation device is turned on within a parking area, searching for a route to a selected exit, and displaying said route on said display unit.

* * * * *